US009102043B2

(12) United States Patent
Morin et al.

(10) Patent No.: US 9,102,043 B2
(45) Date of Patent: Aug. 11, 2015

(54) FASTENER APPLICATOR TOOL AND METHOD

(75) Inventors: Leo Morin, Edmonton (CA); Keith I. Yeats, Edmonton (CA); Martin S. Niles, Stony Plain (CA); Casey Douglas Merrills, Carvel (CA)

(73) Assignee: CANTEGA TECHNOLOGIES INC., Edmonton (CA)

( * ) Notice: Subject to any disclaimer, the term of this patent is extended or adjusted under 35 U.S.C. 154(b) by 0 days.

(21) Appl. No.: 13/304,366

(22) Filed: Nov. 24, 2011

(65) Prior Publication Data

US 2012/0151742 A1 Jun. 21, 2012

Related U.S. Application Data

(60) Provisional application No. 61/416,897, filed on Nov. 24, 2010.

(51) Int. Cl.
*H02B 1/06* (2006.01)
*B25B 31/00* (2006.01)

(52) U.S. Cl.
CPC ........... *B25B 31/00* (2013.01); *Y10T 29/49833* (2015.01); *Y10T 29/49947* (2015.01); *Y10T 29/53478* (2015.01); *Y10T 29/53487* (2015.01); *Y10T 29/53896* (2015.01); *Y10T 29/53909* (2015.01); *Y10T 29/53991* (2015.01)

(58) Field of Classification Search
CPC ........... H02G 3/26; H02G 3/28; H02G 15/18; H02G 1/12; H02G 1/1204; H02G 3/086; H02G 3/088; H02G 3/14; H02G 7/00; B25B 31/00; B25B 13/481; B21J 15/105
USPC ............ 29/432.1, 525.03, 716, 798, 243.521, 29/243.53, 243.54, 243.517, 243.524, 29/26 B, 412, 253; 81/177.2, 53.1, 44, 81/53.11, 53.12; 75/450, 451, 412; 227/119, 176.1; 174/135, 138 F, 50, 1, 174/5 R
See application file for complete search history.

(56) References Cited

U.S. PATENT DOCUMENTS

| | | | | |
|---|---|---|---|---|
| 2,365,787 | A | | 12/1944 | Wallace |
| 3,627,367 | A | | 12/1971 | Levy |
| 3,776,444 | A | * | 12/1973 | Kuehn et al. .................. 227/130 |
| 3,924,509 | A | * | 12/1975 | Alexander ...................... 411/30 |
| 4,653,309 | A | * | 3/1987 | Hendricks et al. ........... 72/391.2 |
| 4,706,868 | A | | 11/1987 | Hammerle et al. |
| 4,745,680 | A | | 5/1988 | Williams et al. |
| 4,965,930 | A | | 10/1990 | Wnukowski |

(Continued)

*Primary Examiner* — Christopher Besler
*Assistant Examiner* — Jun Yoo
(74) *Attorney, Agent, or Firm* — Anthony R. Lambert

(57) ABSTRACT

An applicator tool is disclosed for applying a fastener between cooperating surfaces of a dielectric protector placed at least partially over a component of an electrical power transmission system, the applicator tool made at least in part of dielectric material and comprising: a structural frame element; a fastener mount connected to the structural frame element and moveable relative to the structural frame element between a first position and a second position to at least partially define a fastener drive path; and an actuator connected to drive the fastener mount from the first position to the second position to apply in use a fastener, mounted on the fastener mount, through cooperating surfaces positioned on the fastener drive path. A tool is also disclosed for holding together in alignment two mating surfaces with pre-drilled holes and applying a fastener to penetrate the holes and secure the mating surfaces together.

13 Claims, 22 Drawing Sheets

(56) References Cited

U.S. PATENT DOCUMENTS

| | | | |
|---|---|---|---|
| 5,230,142 A | 7/1993 | Roscizewski | |
| 5,564,852 A | 10/1996 | Maxwell et al. | |
| 6,257,537 B1 * | 7/2001 | Williams | 248/226.11 |
| 6,474,197 B1 | 11/2002 | Browen et al. | |
| 6,642,464 B1 | 11/2003 | Taylor | |
| 6,725,745 B1 | 4/2004 | Palmieri | |
| 6,854,173 B2 | 2/2005 | Hippe | |
| 7,127,972 B2 | 10/2006 | Klein et al. | |
| 7,154,036 B2 * | 12/2006 | Lynch | 174/5 R |
| 7,185,561 B1 | 3/2007 | Eastman | |
| 7,244,470 B2 | 7/2007 | Niles | |
| 7,721,459 B2 * | 5/2010 | Niles | 33/811 |
| 7,834,269 B2 | 11/2010 | Niles | |
| 7,839,256 B2 | 11/2010 | Bradford et al. | |
| 8,069,754 B2 * | 12/2011 | Elgin | 81/125 |
| 8,621,735 B2 | 1/2014 | Niles et al. | |
| 2003/0015330 A1 * | 1/2003 | Wood et al. | 174/5 R |
| 2010/0139459 A1 * | 6/2010 | Jackson | 81/177.2 |
| 2011/0019902 A1 | 1/2011 | Niles | |
| 2011/0192627 A1 | 8/2011 | Niles et al. | |

* cited by examiner

FASTENER APPLICATOR TOOL AND METHOD

CROSS-REFERENCE TO RELATED APPLICATIONS

This application claims the benefit under 35 USC 119(e) of U.S. provisional application Ser. No. 61/416,897 filed Nov. 24, 2010.

TECHNICAL FIELD

This document relates to fastener applicator tools and methods.

BACKGROUND

Fasteners are used to secure plural pieces of material such as steel sheets together. Various applicators exist to install such fasteners, for example conventional riveters or nail guns.

Dielectric covers are used to insulate components of electrical power systems from animals and birds. Examples of such covers are disclosed in US patent publication no. 2008-0123254. Some of these covers are secured in place using simple push fasteners that fit through preexisting holes to secure the pieces of the cover to one another.

SUMMARY

An applicator tool is disclosed for applying a fastener between cooperating surfaces of a dielectric protector placed at least partially over a component of an electrical power transmission system, the applicator tool made at least in part of dielectric material and comprising: a structural frame element; a fastener mount connected to the structural frame element and moveable relative to the structural frame element between a first position and a second position to at least partially define a fastener drive path; and an actuator connected to drive the fastener mount from the first position to the second position to apply in use a fastener, mounted on the fastener mount, through cooperating surfaces positioned on the fastener drive path.

A method is also disclosed of applying a fastener through cooperating surfaces of a dielectric protector placed at least partially over a component of an electrical power transmission system, the method comprising: loading a fastener on a fastener mount of an applicator tool; positioning the applicator tool such that the cooperating surfaces are adjacent the fastener; and driving the fastener mount, by operation of an actuator, relative to at least a portion of the applicator tool to apply the fastener through the cooperating surfaces of material.

An applicator tool is also disclosed for applying a fastener between cooperating surfaces of material, the applicator tool comprising: a structural frame element with a handle; a fastener mount connected to the structural frame element and moveable relative to at least a portion of the applicator tool between a first position and a second position to at least partially define a fastener drive path; a Christmas tree fastener loaded on the fastener mount; and a squeeze trigger associated with the handle and connected to drive the Christmas tree fastener mount from the first position to the second position to apply, in use, a fastener mounted on the fastener mount through cooperating surfaces of material positioned on the fastener drive path.

A tool is also disclosed for holding together in alignment two mating surfaces with pre-drilled holes and applying a fastener to penetrate the holes and secure the mating surfaces together.

In various embodiments, there may be included any one or more of the following features: A handle may extend from one or both of the structural frame element and the fastener mount for operation of the actuator. The handle may comprise a hot stick stock made at least in part of a dielectric material, and the actuator may be operatively connected to the hot stick stock. The actuator may be operatively connected to an operation end of the hot stick stock opposed to a fastener end of the structural frame element. The applicator tool may comprise one or more spacer brackets between the actuator and the hot stick stock. The actuator may comprise a drive rod connected to the fastener mount through one or more lever arms. The drive rod may be made at least in part of a dielectric material. A trigger may be connected for operation of the actuator from the handle. The trigger may comprise one or more of a slide element, lever, or squeeze trigger. The trigger may be mounted on the handle. The trigger may comprise a squeeze trigger associated with the handle. The handle may be extendable. The fastener mount may be pivotally connected to the handle. The actuator and one or both of the structural frame element and the fastener mount may be adapted to connect in use to a hot stick stock. A backing arm may be connected to the structural frame element and spaced from the fastener mount when in the first position to define a gap for insertion of the cooperating surfaces into the fastener drive path. The backing arm may be repositionable about a fastener drive axis defined by the fastener mount. The fastener mount may comprise a plunger rod. The fastener mount may be connected for radial movement with the backing arm about the fastener drive axis. A fastener may be mounted on the fastener mount. The fastener may comprise a push fastener. The fastener may comprise a Christmas tree fastener. A retainer may at least partially restrict axial release of the fastener from the fastener mount. The retainer may be shaped to at least partially surround a backing of the fastener, the retainer defining an axial passage for a tip of the fastener to extend beyond the retainer for at least partial application through the cooperating surfaces. The retainer may be formed within the fastener mount and may further define a lateral passage for insertion and removal of the fastener from the fastener mount. The fastener mount may comprise an outer axial mount surface for driving in use a partially applied and unretained fastener through the cooperating surfaces. The retainer may be adapted to release the fastener after an initial drive phase from the first position. The applicator tool comprises a fastener reloader. The electrical power transmission system may be energized, the applicator tool may be made at least partially of dielectric material, and positioning may comprise positioning the applicator tool at least partially within a safe Limit of Approach. Positioning and driving may be done by a user who is in a position outside the safe Limit of Approach. The fastener mount may be located at a fastener end of the applicator tool, positioning may comprise positioning the hot stick stock such that the cooperating surfaces are adjacent the fastener, and driving may comprise operating the actuator from an operation end of the hot stick stock opposed to the fastener end. The fastener may be driven through aligned holes within the cooperating surfaces. The one or more of the aligned holes may be formed with one or both of the fastener or the applicator tool. The fastener may be a Christmas tree fastener that is at least partially applied through one of the cooperating surfaces before being loaded on the fastener mount. Driving may further comprise partially applying the fastener through the cooperating surfaces while at least partially restricting axial release of the fastener from the fastener mount with a retainer; releasing the fastener from the retainer; and further applying the fastener through the cooperating surfaces.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 2:
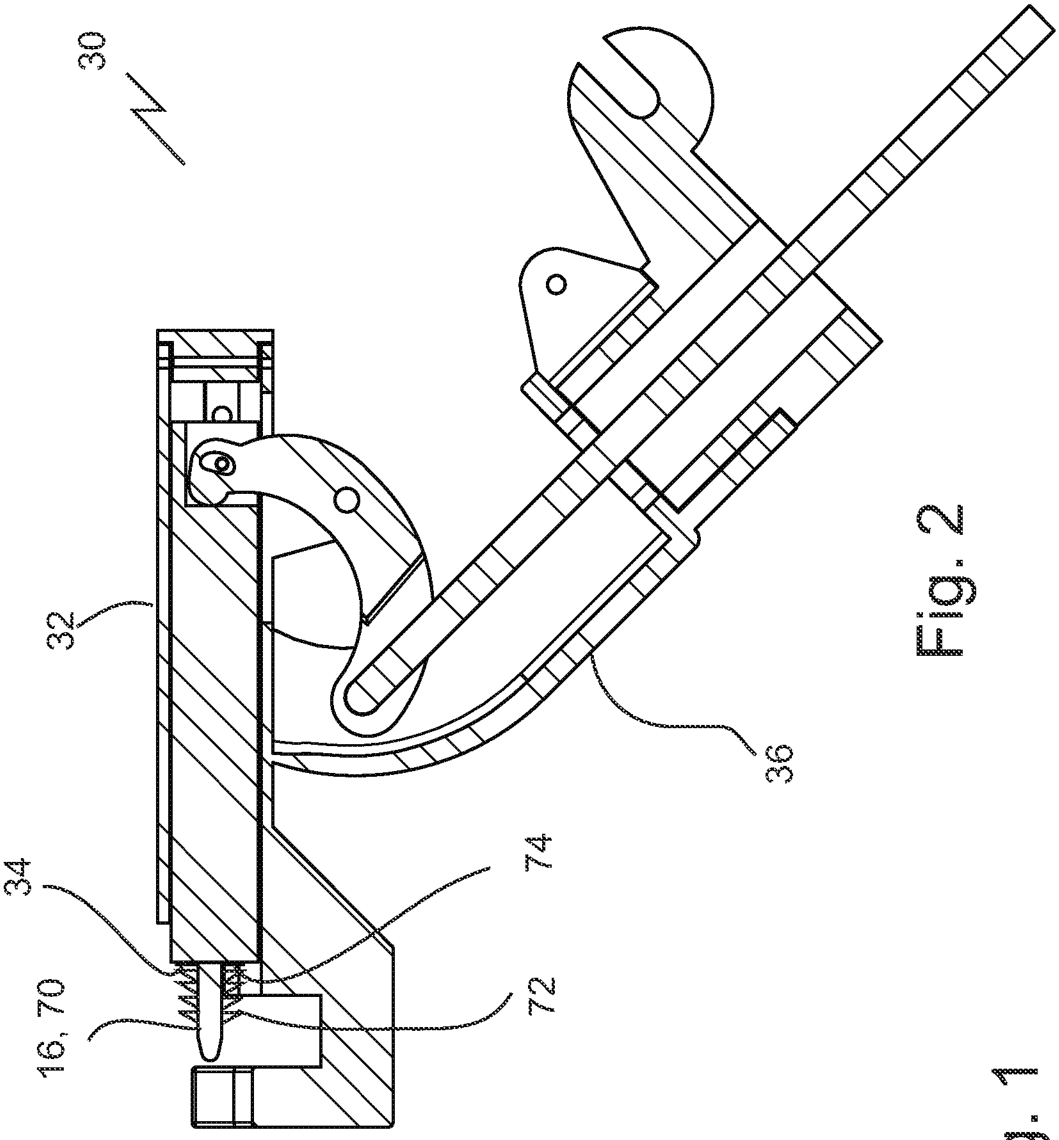
FIG. 2 is a cross-sectional view taken along the section lines 2-2 from FIG. 1.

Immaterial modifications may be made to the embodiments described here without departing from what is covered by the claims.

Long-distance electricity transmission is typically carried with high voltage conductors. Transmission at higher voltages reduces resistance power loss, therefore line voltage for long distance lines is stepped up after generation by passing it through transformer stations prior to feeding the power to long-distance transmission lines. Transmission lines traverse large regions and require numerous support towers. The conductors in high tension powerlines are typically uninsulated because of the cost and additional weight of insulated versus uninsulated conductors. Because clearances between adjacent energized elements, and energized and grounded elements, are generally large in transmission systems, these systems generally are not at risk for animal-caused faults or outages.

Substations transform power from transmission voltages to distribution voltages, typically ranging from 2400 volts to 37,500 volts. Distribution voltages allow for reduced system clearances. These reduced clearances between phase to ground and phase to phase increase station susceptibility to bird or animal caused outages. Electric poles, towers, and other electrical equipment including substations may provide attractive roosts for birds, particularly in treeless regions. If the wings of a bird simultaneously contact a conductor and another object such as an adjacent conductor, support tower or tree, the resulting electrical short-circuit can kill the bird and also damage the power system. The electrical short circuit can further cause electrical system damage resulting in power outages.

Further, the nesting of birds in open cavities in electrical systems increases the risk that predators will be attracted to the nests and cause a power fault or outage. Predators can be mammals such as raccoons and cats, birds such as magpies, and snakes. Predators can also cause electrical short-circuits that can cause electrical faults or outages, damage power systems, and kill the predator. Faults caused by birds and other animals often trigger sensitive relay protection schemes, resulting in substation lockouts, interrupting service to thousands or possibly tens of thousands of customers and at the same time damaging expensive substation equipment.

Thus, in the field of electrical power transmission and distribution there is a need to insulate electrical power systems from short circuits caused by contact by birds and other animals. The variety and number of proposed solutions for repelling birds and other animals from electrocution risks highlights the persistence and magnitude of the problems created by such undesirable intrusion. Many different types of scarecrows and other moving devices have been developed to repel birds. In addition to moving devices, various physical structures often involving spikes or other physical barriers, have been developed to discourage birds from roosting on structures. Other bird repelling concepts use electricity or magnetic fields to discourage bird intrusion. Equipment shield and cage devices have been specifically designed to block birds and other animals from accessing and short-circuiting electrical leads, such as described in U.S. Pat. Nos. 5,153,383 and 5,485,307.

The inventor's own prior patent document discloses dielectric covers for protecting components of electrical power transmission systems, see United States patent publication no. 20080123254, as well as methods of making such protectors. Other dielectric cover protectors are available.

Generally, the process of retrofitting electrical equipment with dielectric covers may be costly and may require powering down the system. Power downs for the purpose of measuring electrical equipment for protective covers can keep a system down for a half a day or longer time periods, at great cost. Some systems are operated under the direction of a regulatory and scheduling authority that controls the system's downtime scheduling. In locations with minimal spare power transmission capacity, it can be a challenge for a system to get the downtime needed to measure its equipment. Because electrical systems are usually scheduled for maintenance downtime on a fairly short notice (typically a week for non-emergency situations), and because scheduled downtime may be cancelled by the Regulatory Authority on an extremely short notice, there is no guarantee that a component protector will be installed during a system's available downtime period. As a result, a system can experience significant delays in protecting their equipment.

Figure 3A:
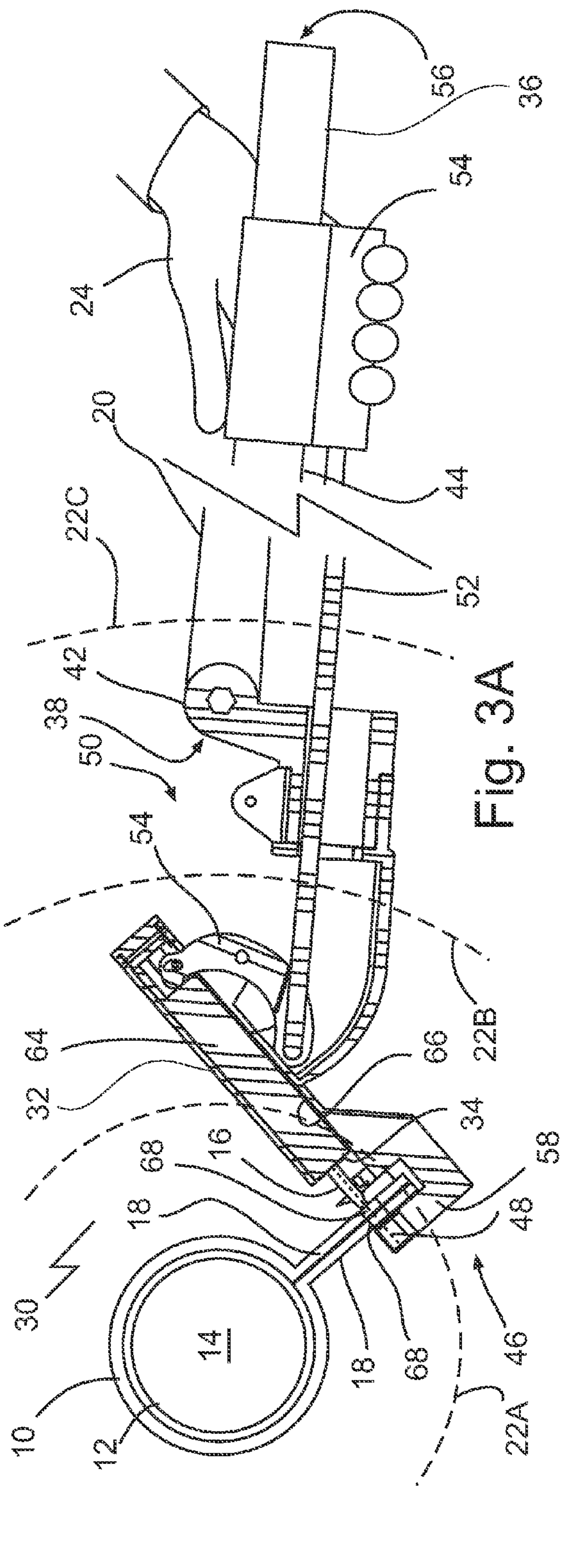
FIGS. 3A-B are cross-sectional views that illustrate the operation of an applicator tool with a hot stick stock.
Figure 8:
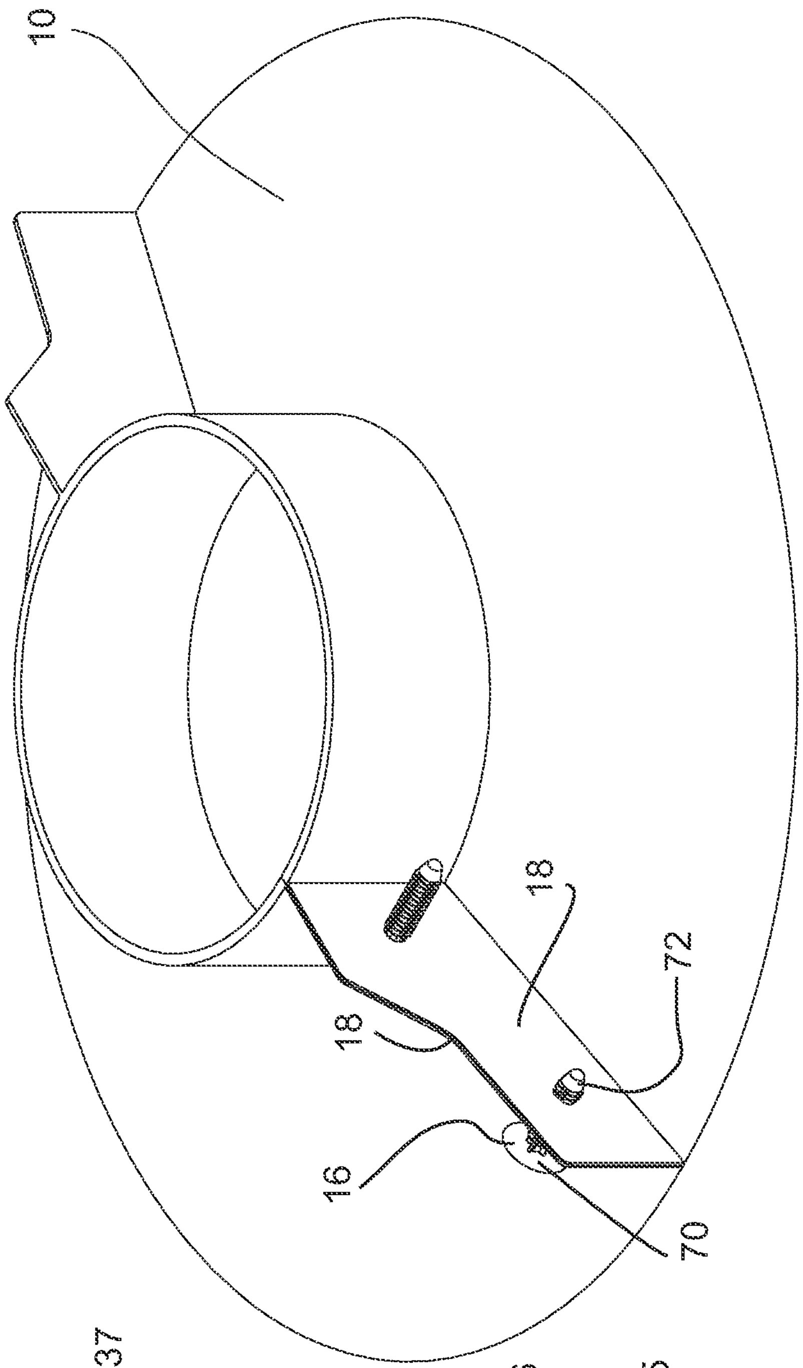
FIG. 8 is a side elevation view of a Christmas tree fastener pre-installed in one of two cooperating surfaces of a dielectric cover.

Referring to FIG. 3A, there exists a variety of dielectric covers 10 used to insulate components 12 of electrical power systems 14 from animals and birds. FIG. 8 illustrates a further example of a cover 10 referred to as a teacup cover and sold by Cantega Technologies Inc. of Edmonton, Canada. Some of these covers are secured in place using simple fasteners 16 such as push fasteners as shown that fit through cooperating surfaces 18 of the cover 10. Conventionally, these fasteners 16 are hand-installed on covers 10 located on equipment that has been de-energized. The workers installing the fasteners 16 may be wearing personal protective equipment such as Kevlar gloves, which can make it awkward to handle small items such as fasteners. Such challenges make fastener installation slow and increase the amount of costly equipment downtime needed to secure the covers in place. In addition, it is not always feasible to de-energize electrical equipment in order to install protective covers 10 and as a result, it is highly desirable to be able to install and secure covers remotely on energized equipment. Remote installation may also be desirable on energized or non-energized equipment that is difficult to access directly. Therefore, there is a need for a tool that can be used in combination with a dielectric hotstick 20 by a user 24 located outside the safe limit of approach 22C for energized equipment in order to remotely fasten covers 10 in place.

Figure 1:
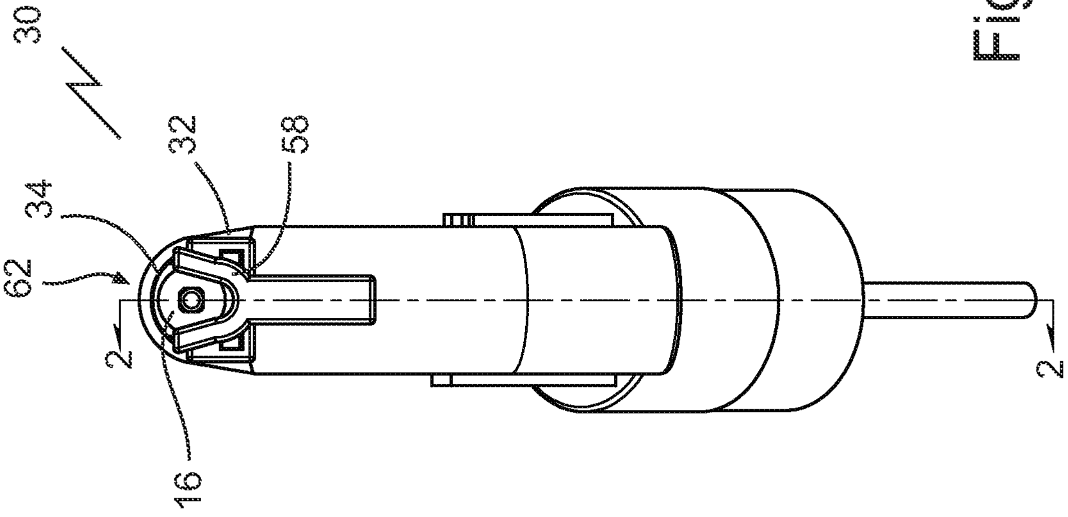
FIG. 1 is a front elevation view of an applicator tool for applying a fastener, the view being down the drive path of the tool

Referring to FIGS. 1, 2, and 3A, an applicator tool 30 is disclosed and comprises a structural frame element 32 and a fastener mount 34. Applicator tool 30 may be for applying a fastener 16 between cooperating surfaces 18 (FIG. 3A) of material, for example cooperating surfaces 18 of a dielectric protector 10 placed at least partially over a component 12 of an electrical power transmission system 14. For the latter case, the applicator tool 30 may be made at least in part of dielectric material. Applicator tool 30 may further comprise an actuator 50 (FIGS. 3A-B) connected to drive the fastener mount 34 from the first position to the second position to apply in use a fastener 16, mounted on the fastener mount 34, through cooperating surfaces 18 positioned on the fastener drive path 48.

Figure 3B:
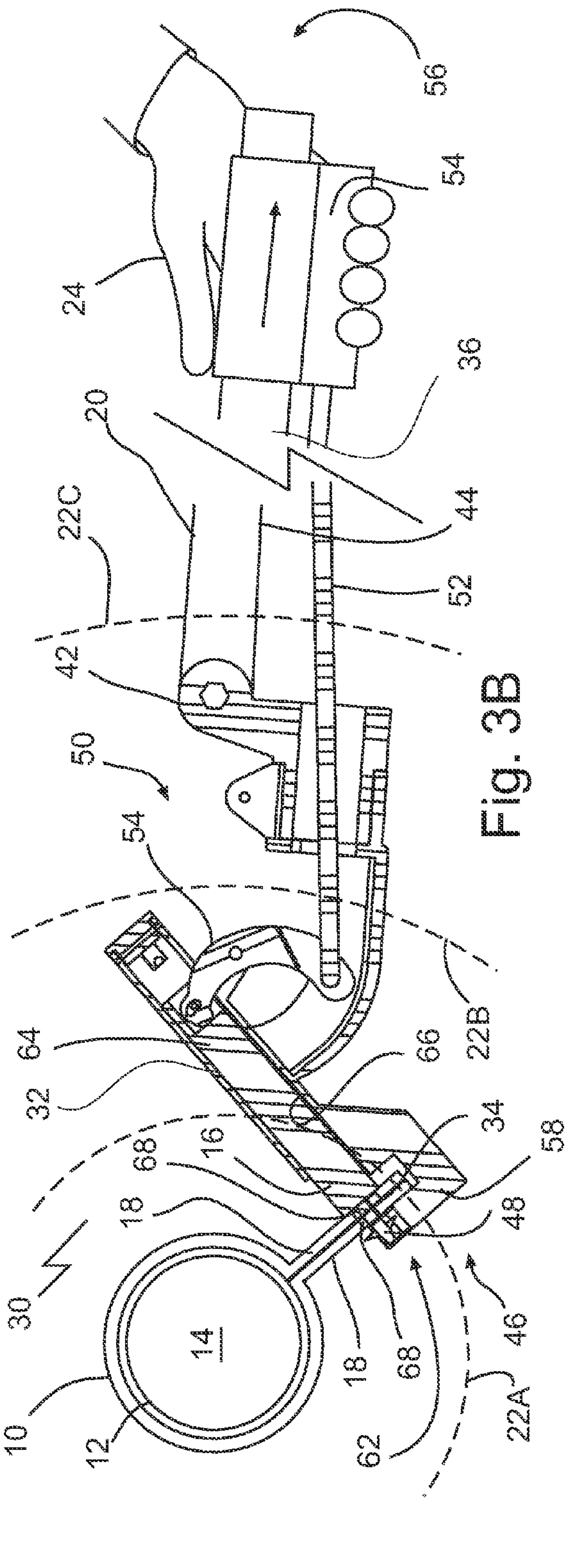
Figure 7:
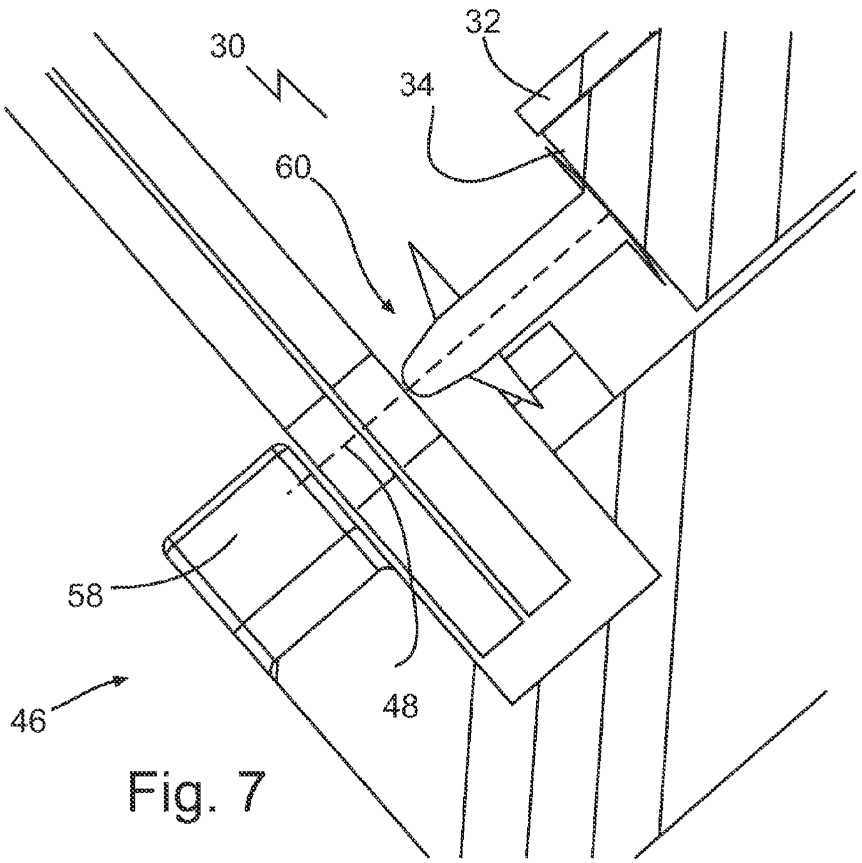
FIG. 7 is a close-up of a portion of FIG. 3A illustrating the drive path of the fastener mount and fastener.

Referring to FIGS. 3A-B and 7, fastener mount 34 is connected to structural frame element 32, for example at a fastener end 46 of the structural frame element 32. Fastener mount 34 is moveable relative to at least a portion of applicator tool 30, for example structural frame element 32, between a first position (shown in FIG. 3A) and a second position (shown in FIG. 3B) to at least partially define a fastener drive path 48 (shown with dashed lines in the detailed close-up of FIG. 7).

Figures 4A, 4B, 5A, 5B:
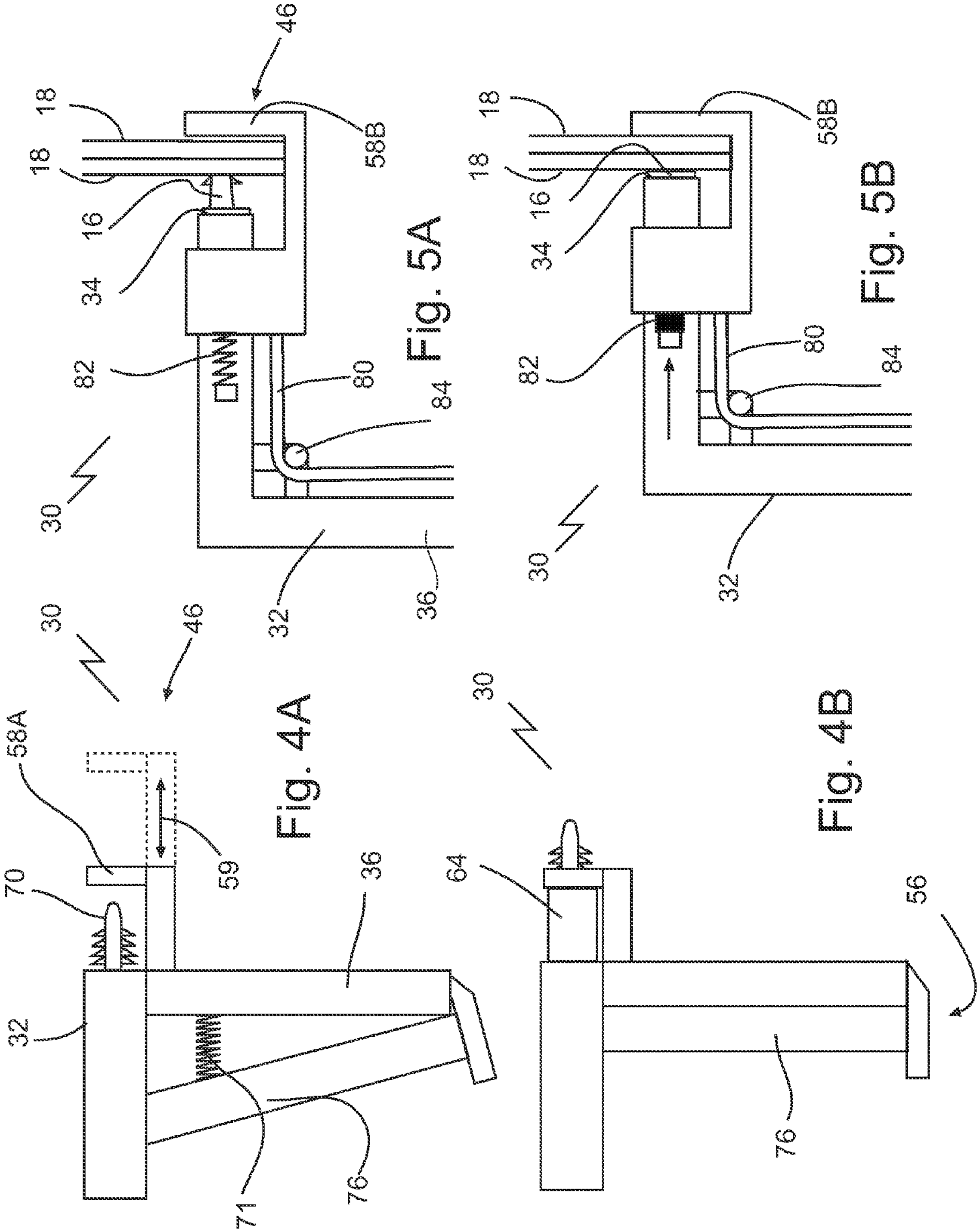
FIGS. 4A-B are side elevation views that illustrate the operation of a hand-held applicator tool.
FIGS. 5A-B are side elevation views that illustrate the operation of another embodiment of an applicator tool.

Referring to FIGS. 3A, 4A, and 5A, the applicator tool 10 may comprise a handle 36. Handle 36 may extend from one or both of the structural frame element 32 (FIG. 3A) and the fastener mount 34 (FIG. 5A) for operation of the actuator. Handle 36 may be provided as part of one or both of structural frame element 32 or fastener mount 34 for directly manipulating the tool 30 (FIG. 4A), or handle 36 may be provided as a removable component connected to one or both of structural frame element 32 or fastener mount 34 (FIG. 3A). Handle 36 may comprise a hot stick stock 44 (FIG. 3A) made at least in part of a dielectric material. The actuator 50 and one or both of the structural frame element 32 and the fastener mount 34 may be adapted to connect in use to a hot stick stock 44 (FIG. 3A), for example through a suitable connector such as a universal spline attachment 42 for connection to a standard hot stick 20 such as a shot gun hot stick. Other connections may be used, such as a rod cap 186 and pin 188 connection shown in FIG. 22.

Referring to FIG. 3A, the actuator 50 may be operatively connected the hot stick stock 44. Actuator 50 may comprise a drive rod 52 connected to the fastener mount 32 through one or more lever arms 54. Although actuator 50 is illustrated as operating by lever action, the actuator 50 may operate by other devices such as by pulley, cable 80 (FIG. 5A) chain and sprocket, gears, solenoid, and other linkages of any kind whether mechanical or electrical or electromechanical. In the embodiment illustrated, a pulling motion relative to the hot stick stock 44 is required to drive in the fastener, however actuator 50 may be adapted to accomplish the same movement with a pushing motion. Other forms of movement may be incorporated. Because the drive rod 52 effectively forms part of the connection between the tool and user 24, the drive rod 52 may be made at least in part and preferably fully of a dielectric material to reduce chance of electrical transfer to user 24. A trigger, such as a slide element 54, may be connected for operation of the actuator 50 from the handle 32. Slide element 54 may be mounted on the operation end 56 of the hot stick stock 44 for operation of the drive rod 52, for example in a fashion similar to a shotgun style hot stick. The operation of the slide element 54 to apply the fastener 16 is illustrated in FIG. 3B. In some embodiments (not shown), drive rod 52 is contained at least in part within hot stick stock 44. Other triggers may be used, such as a lever 106 (FIG. 11) or a squeeze trigger 76 (FIG. 4A).

Figure 11:
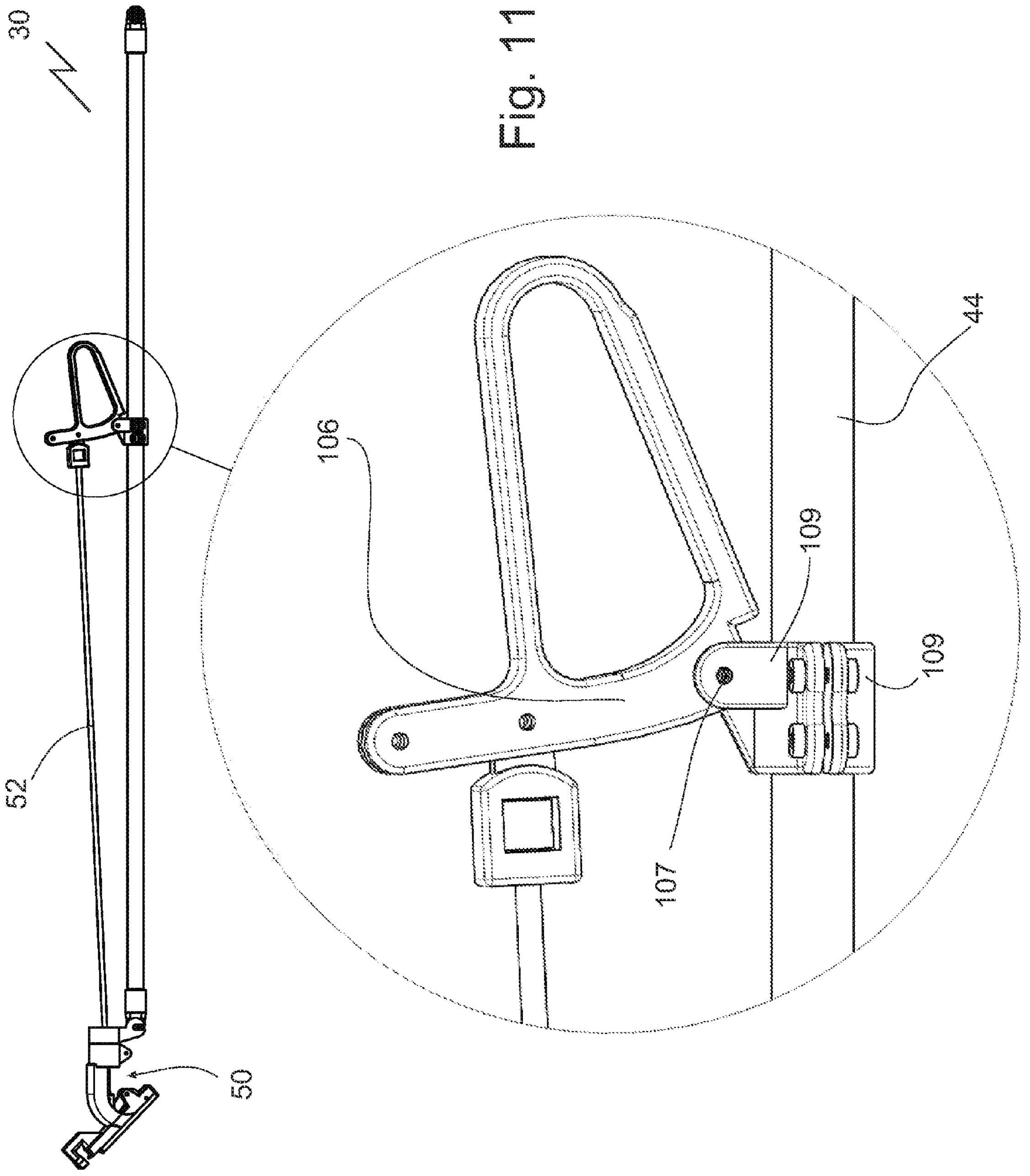
FIG. 11 is a side elevation view and close-up of a further applicator tool connected to a hot stick stock.

In cases where a hot stick 20 or hot stick stock 44 are present, the actuator 50 may be operatively connected to operation end 56 of the hot stick 20 or hot stick stock 44. Operation end 56 is understood to be in opposed relation to the fastener end 46 of the structural frame element 32. Reference to various elements in relation to ends 46/56 in this document refers to a general positioning and should not be restricted to only a limited interpretation such as absolute extremity. Referring to FIG. 3B, for example slide element 54 is illustrated as being near, but not literally at, operation end 56. It should also be understood that the hot stick stock 44 and hot stick 20 may refer to the same item. Referring to FIG. 11, the trigger, in this case lever 106, may be located elsewhere along the hot stick stock 44 as shown.

Figure 13:
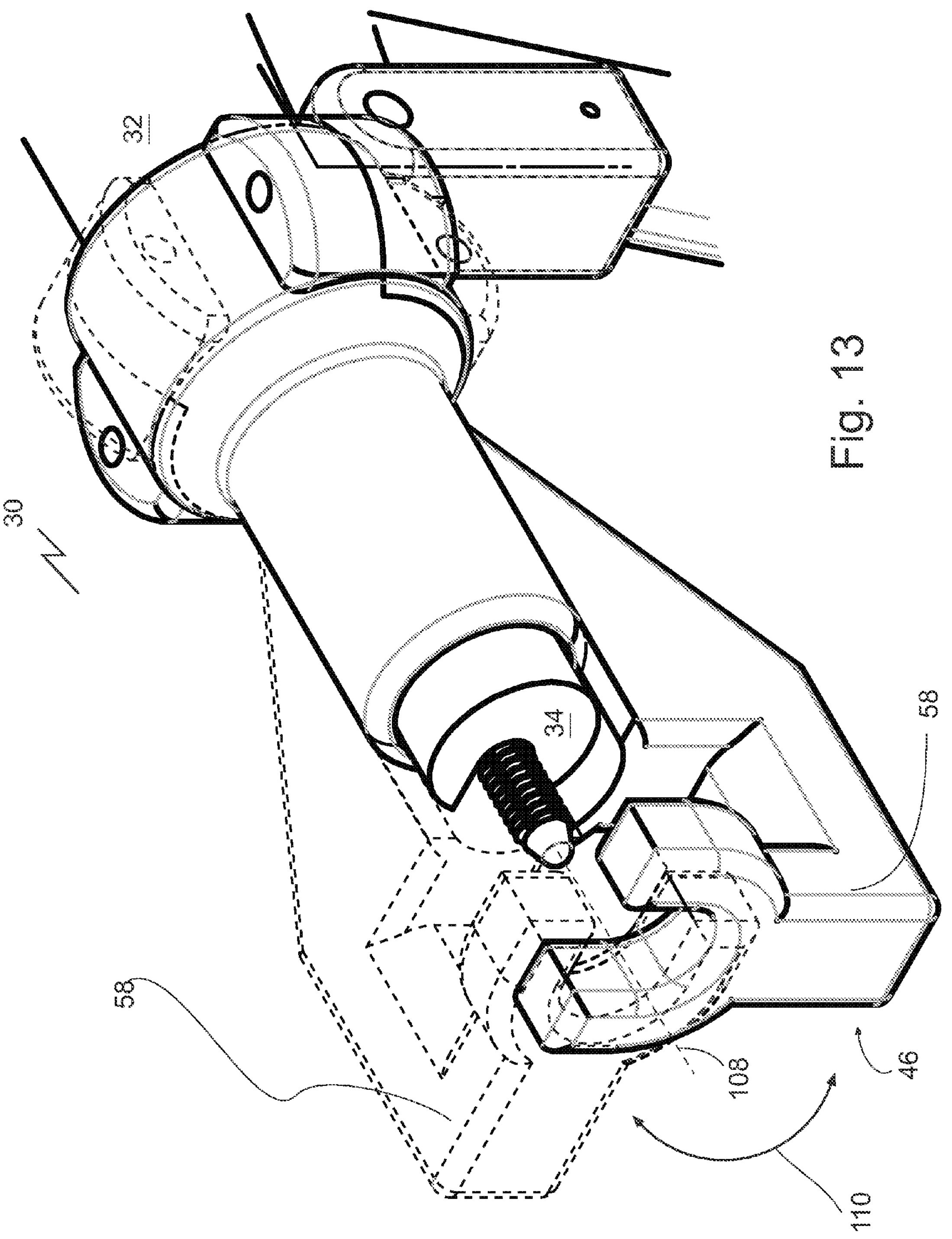
FIG. 13 is a perspective view of the fastener end of the applicator tool of FIG. 12, illustrating in dashed lines an example of how the backing arm may be repositioned.

Referring to FIGS. 1, 3B, 7 and 13, applicator tool 30 may further comprise a backing arm 58 connected to the structural frame element 32, for example at a fastener end 46 of the structural frame element 32. Backing arm 58 may be spaced from the fastener mount 34 when in the first position as shown to define a gap 60 (FIG. 7) for relative insertion of the cooperating surfaces 18 into the fastener drive path 48. FIGS. 1 and 3B illustrate that backing arm 58 may be shaped to define a passage 62 for fastener 16 to pass at least partially through in use, for example when fastener mount 34 is moved into the second position. Backing arm 58 acts to hold cooperating surfaces 18 in place while fastener 16 is being driven through. Backing arm 58 may be advantageous when securing flexible cooperating surfaces 18, such as flexible dielectric spray-molded surfaces, which upon application of driving pressure from a fastener 16 may otherwise flex and prevent application. In addition backing arm 58 is useful when installing fasteners 16 along the edges of cooperating materials. Referring to FIG. 13, the backing arm 58 may be repositionable about a fastener drive axis 108 defined by the fastener mount 34. A directional arrow 110 and dashed lines are used to illustrate the type of motion envisioned in the embodiment of FIG. 13.

Referring to FIG. 4A, backing arm 58A may be retractable, for example as shown with the directional arrows 59. For example, a further actuator (not shown) may be used to adjust the position of the backing arm 58A as shown to clamp the cooperating surfaces 18 together before application of fastener 16. In hot stick embodiments, the further actuator may be connected for operation from the operation end 56.

Referring to FIGS. 3A-B, the fastener mount 34 may comprise a plunger rod 64. As such, the drive action of the fastener mount 34 may drive plunger rod 64 along an axial path, for example guided by a barrel or cylinder 66 as shown. Other embodiments of operation are possible, such as embodiments where fastener mount 34 is driven along a curved drive path. A curved drive path may be defined as a result of fastener mount 34 being adapted to swing in a jaw-like fashion. However, the axial drive path 48 shown in FIG. 3A is linear and thus allows easy targeting and application of fasteners 16, especially when aiming for application through aligned holes 68 in cooperating surfaces 18. Aligned holes 68 may be pre-drilled.

Figure 30A:
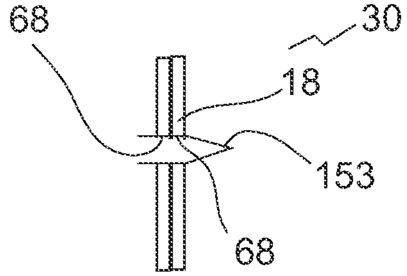
Figure 30B:
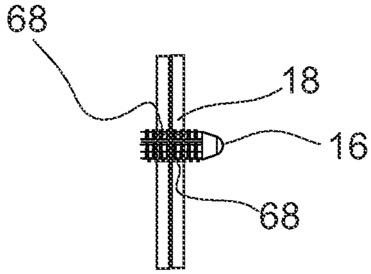

Referring to FIGS. 2 and 3A, a fastener 16 such as a push fastener as shown may be mounted on the fastener mount 34. The fastener 16 may comprise a Christmas tree fastener 70 (FIG. 2). Christmas tree fasteners 70 are understood to comprise a series (at least two) of flanges 72, projections, or corrugations angled to allow easy entry into, and difficult removal from, a material. A backing 74 may also be included as part of fastener 70 to prevent the Christmas tree fastener 70 from being pushed all the way through the material during application. Christmas tree fasteners 70 are advantageous for use on dielectric covers 10 because fasteners 70 may be constructed from flexible or resilient dielectric materials, are simple to install, and act to tightly secure two cooperating surfaces 18 together between the series of flanges 72 even if fastener 70 is not installed right up to the backing 74. Christmas tree fasteners 70 are also designed for permanent use and cannot be easily removed. Other fastener types may be used, such as two piece fasteners and snap fasteners. In the case of a two piece fastener (not shown), the backing 58 is adapted to hold one of the pieces. Two piece fasteners typically have a male part and a female part. In addition, the fastener itself may be used to form holes in the cooperating surfaces 18, for example if the fastener terminates in a sharp tip or needle (not shown). In some embodiments, the fastener mount 34 may comprise a needle for mounting the fastener 16, and further optionally for piercing cooperating surfaces 18. Referring to FIGS. 30A-B, in general one or both of the fastener 16 or the applicator tool 30 may form one or more of the holes 68 in the cooperating surfaces 18. For example, applicator tool 30 may extend and retract a needle 153 to form holes 68, and then drive fastener 16 through the surfaces 18. One of holes 68 may be pre-formed so that applicator tool 30 punctures fewer cooperating surfaces 18, reducing the force required to form the remaining hole or holes 68. Forming the hole or holes 68 and driving the fastener 16 may be achieved in one or more movements of the trigger (not shown). In some cases the applicator tool 30 has a hole forming portion (not shown) and a fastener driving portion (not shown), both portions of which may be operated simultaneously, serially, or independently by a user from the user end of the tool. The hole forming portion may comprise a drill.

Referring to FIGS. 4A-B, handle 36 may extend from the structural frame element 32. The embodiment shown comprises a squeeze trigger 76 associated with the handle 36. The trigger 76 may be connected for operation of the actuator 50 (shown in FIG. 3A), or may itself act as an actuator, for example by a direct linkage to a plunger rod 64 as shown in FIG. 4B. As shown, the tool 30 may have mounted on fastener mount 34 a Christmas tree fastener 70. A biasing mechanism such as a spring 71 may be used to retract the squeeze trigger 76.

Referring to FIGS. 5A-B, fastener mount 34 may be driven indirectly, for example by a pulling motion on a cable 80 attached to backing arm 58B. Backing arm 58B is connected in this embodiment to slide along structural frame element 32 in the fashion illustrated, the motion of which drives fastener 16 through cooperating surfaces of material 18. A spring 82 may be employed to reset backing arm 58B. Cable 80 may be wrapped around a pulley bar 84 extending from structural frame element 32.

Figures 12A, 12B, 12C, 12D, 12E:
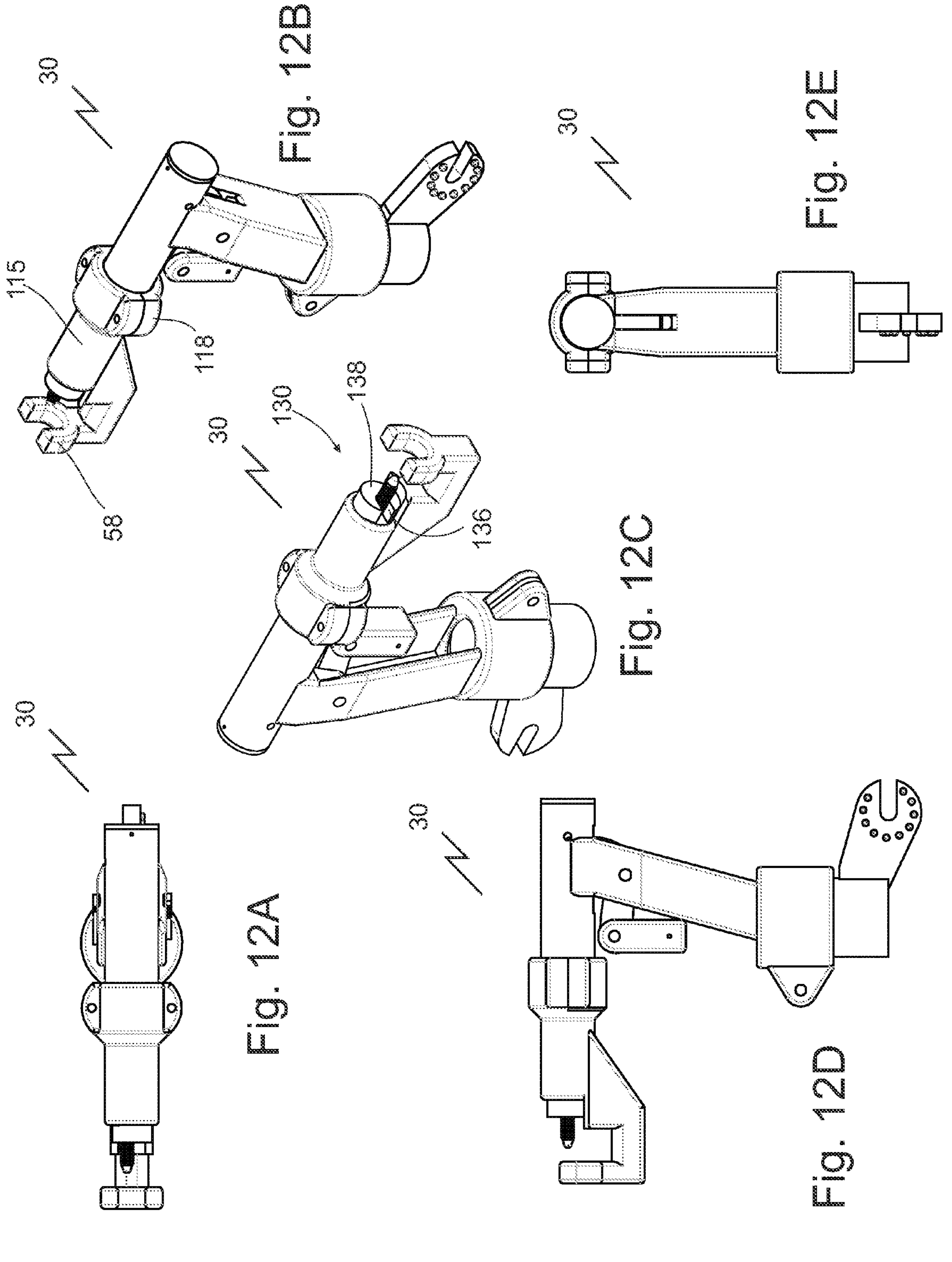
FIGS. 12A-E are top plan, rear perspective, front perspective, side elevation, and rear elevation views, respectively, of another embodiment of the tool.
Figure 14:
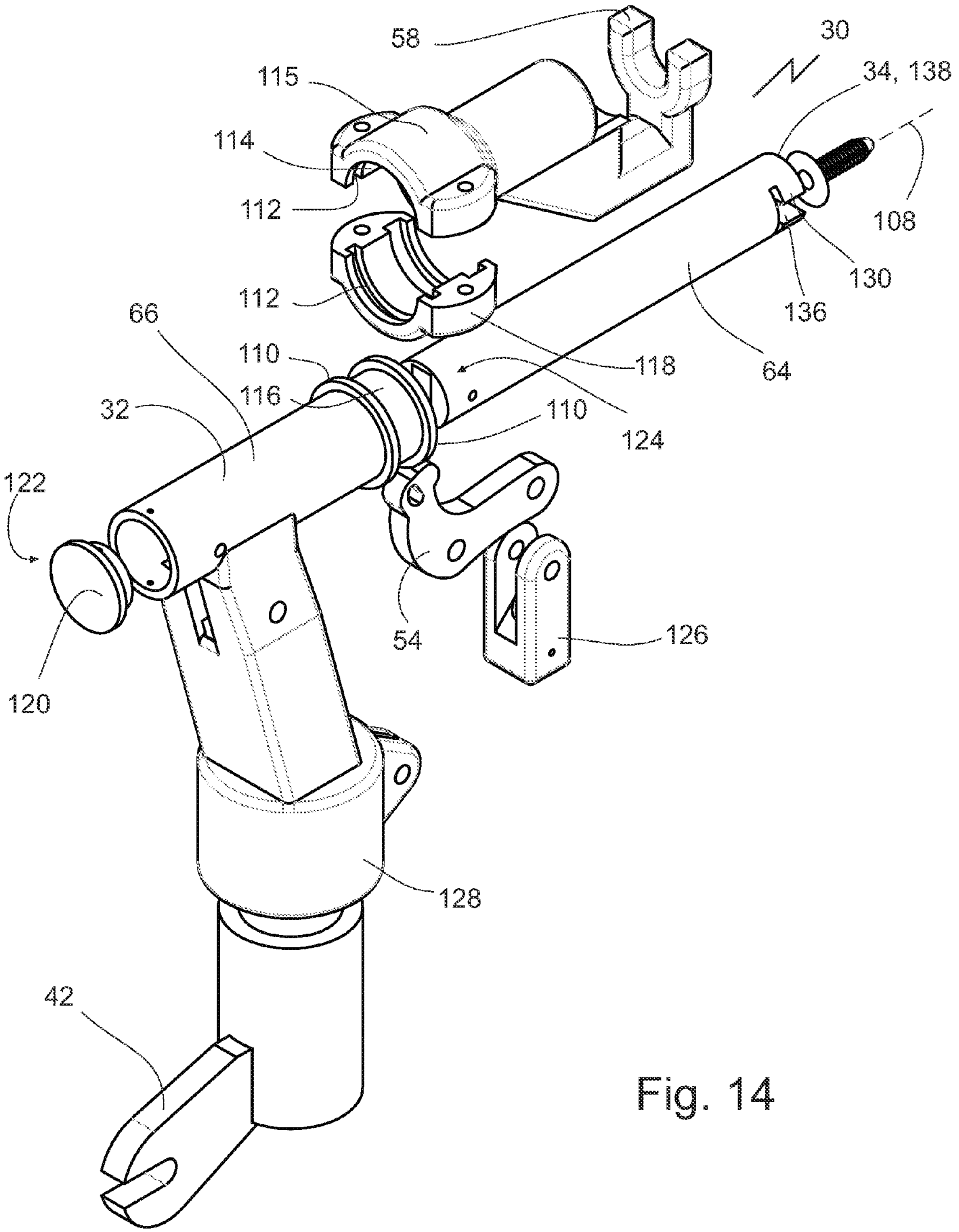
FIG. 14 is an exploded view of the applicator tool of FIG. 12.
Figure 15:
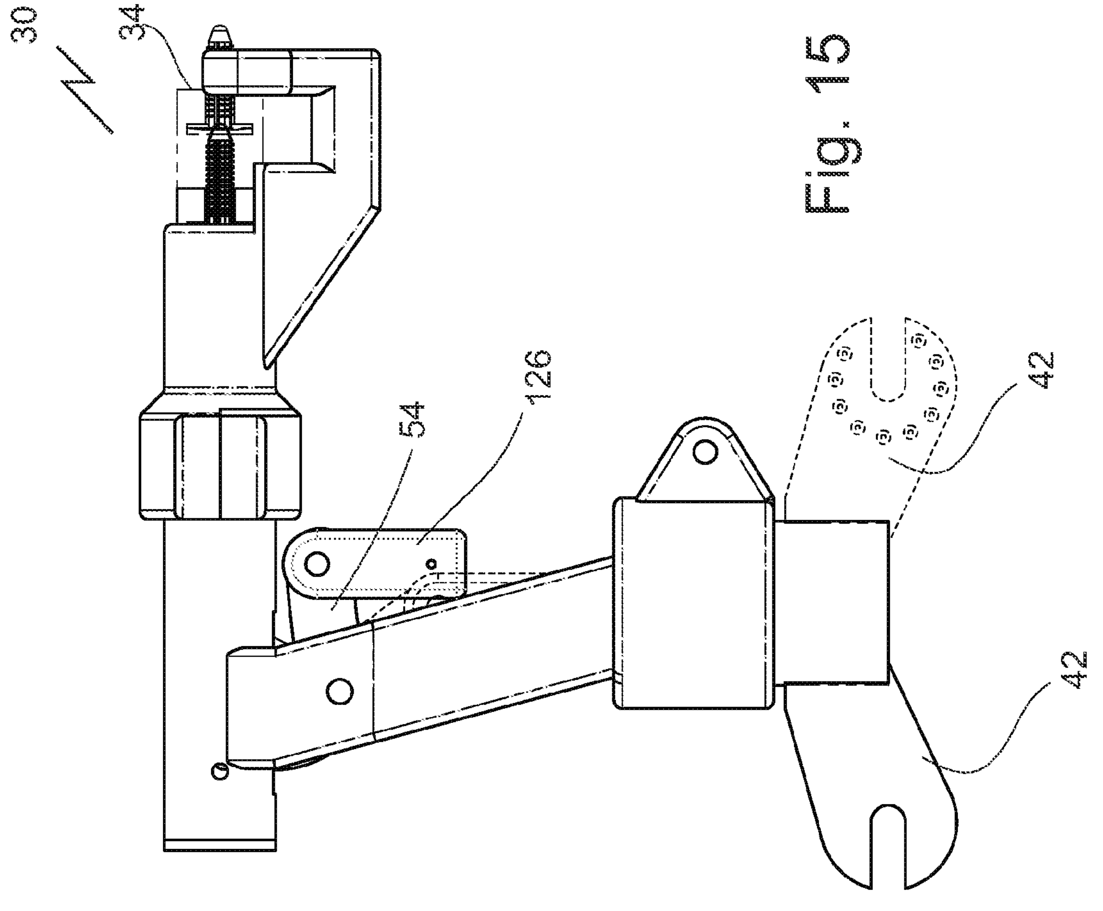
FIG. 15 is a side elevation view of the applicator tool of FIG. 12, illustrating the drive motion of the fastener mount in dashed lines. In addition, dashed lines are used to indicate a second possible location for the hot stick connector.

Referring to FIGS. 12A-E, 13, and 14, a further embodiment of an applicator tool 30 is illustrated. Similar to FIG. 3A, tool 30 has a cylinder 66 and plunger rod 64 (FIG. 14). As discussed above, backing arm 58 is repositionable about a fastener drive axis 108 defined by the fastener mount 34 (FIGS. 13 and 14). To achieve this function, backing arm 58 connects to structural frame element 32 through a tongue 110 and groove 112 connection (FIG. 14). In the example shown, grooves 112 are formed in an inner cylindrical surface 114 of a body portion 115 of backing arm 58, while tongues 110 are formed in an outer cylindrical surface 116 of structural frame element 32. This may allow 360 degree rotation about axis 108. A mechanism (not shown) may be used to temporarily lock and unlock the backing arm 58 radially in place. FIG. 14 illustrates one example of structure capable of carrying out this function, although other structures may be used. Backing arm 58 may be attached to structural frame element 32 by use of a bracket 118 connected to body portion 115 as shown (FIG. 12B, 14). Body portion 115 may provide part of the cylinder 66 as shown. A cap 120 may be used to close off the end 122 of cylinder 66 opposite the end 124 through which plunger rod 64 extends in use (FIG. 14). FIGS. 14 and 15 illustrate the positioning and movement (FIG. 15) of lever arm 54 and a connector 126 for connecting with drive rod 52 (shown in FIG. 11). Structural frame element 32 also has a handle portion 128 extending from cylinder 66 and including universal spline attachment 42 for connection to a hot stick stock (not shown). FIG. 15 illustrates in dashed lines another possible location for universal spline attachment 42.

Referring to FIG. 11, an embodiment of applicator tool 30 is illustrated assembled as a hot stick device. Lever 106 may be pivotally connected to hot stick stock 44, for example through brackets 109, to provide a vertex 107 about which drive rod or tape 52 may be pushed or pulled to operate actuator 50.

Figure 6:
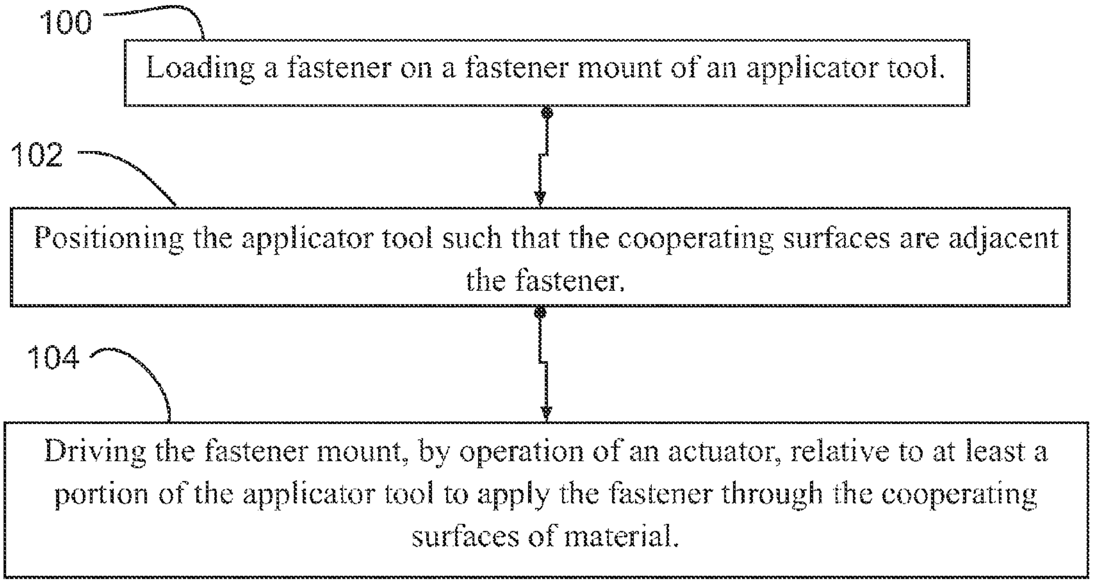
FIG. 6 is a method of operation of an applicator tool, for example a method of applying a fastener through cooperating surfaces of a dielectric protector placed at least partially over a component of an electrical power transmission system.
Figure 29:
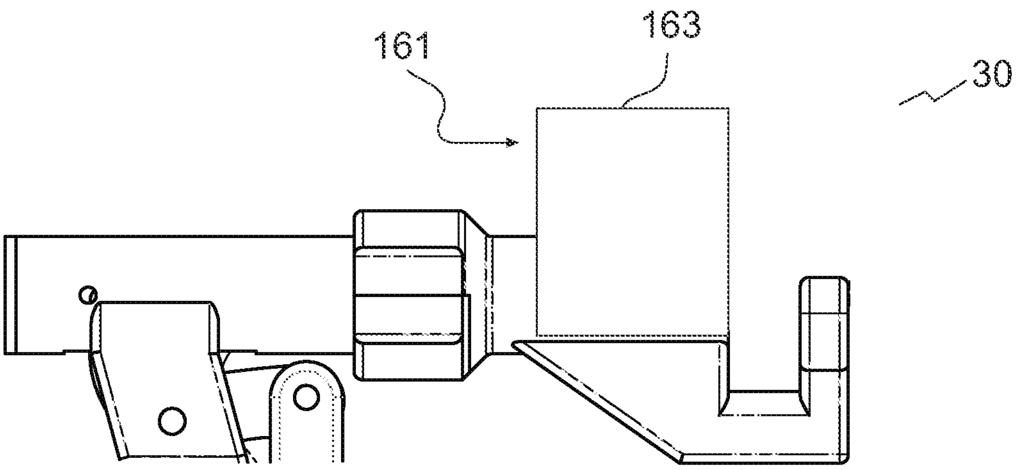

Referring to FIG. 6, a method of applying a fastener 16 through cooperating surfaces 18 of a dielectric protector 10 placed at least partially over a component 12 of an electrical power transmission system 14 is illustrated. The method stages will now be described with reference to the other figures. In a stage 100 a fastener 16 (shown for example in FIG. 3A) is loaded on a fastener mount 34 of an applicator tool 30. Loading may occur manually or by automatic loading from a magazine of fasteners (not shown). In some cases FIG. 29), applicator tool 30 comprises a fastener reloader 161, which may include a magazine 163, for loading a fastener 16 (not shown) on fastener mount 34 (not shown) after a preceding fastener 16 (not shown) has been driven. In a stage 102, the applicator tool 30 is then positioned such that the cooperating surfaces 18 are adjacent the fastener 16. The surfaces 18 need not directly touch the fastener 16, but surfaces 18 should be within the fastener drive path 48. In a stage 104, the fastener mount 34 (FIG. 3B) is driven, by operation of actuator 50, relative to at least a portion of the applicator tool 30 such as structural frame element or body 32 to apply the fastener 16 through the cooperating surfaces 18 of material.

Figure 9A:
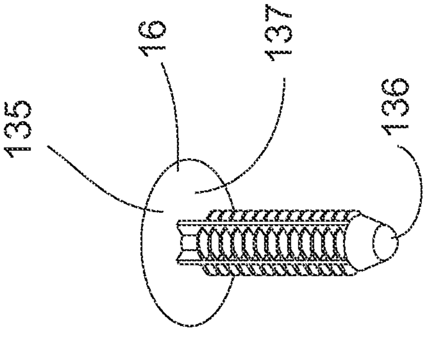
FIGS. 9A-B are perspective and side elevation views, respectively, of a Christmas tree fastener.
Figure 9B:
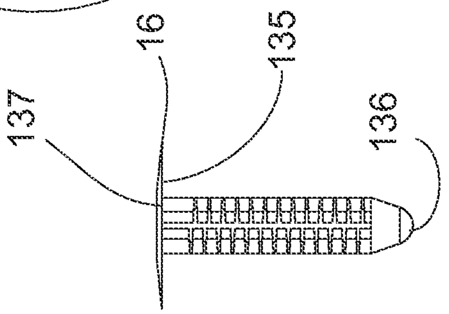
Figure 10A:
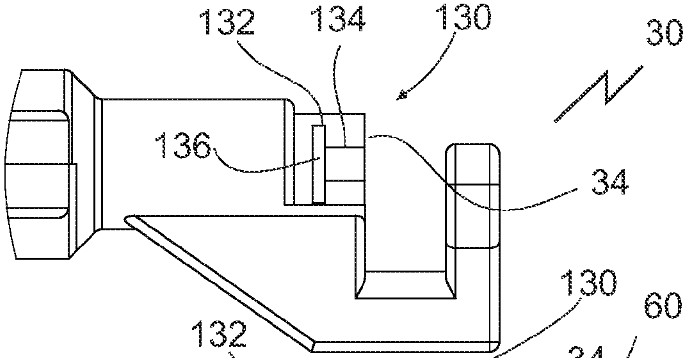
FIGS. 10A-E are side elevation views that illustrate a method of operation of an applicator tool with a fastener retainer.
Figure 10B:
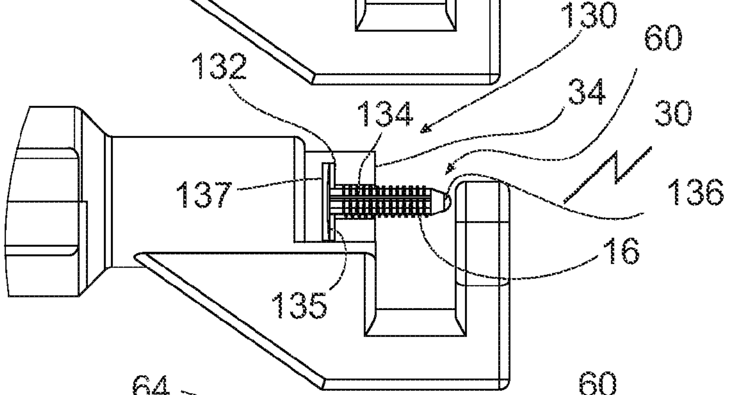
Figure 10C:
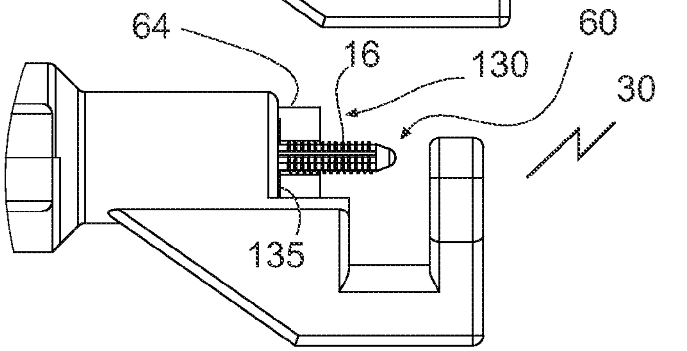
Figure 10D:
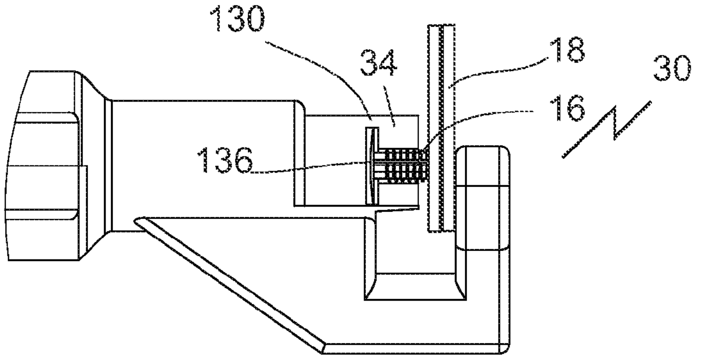
Figure 10E:
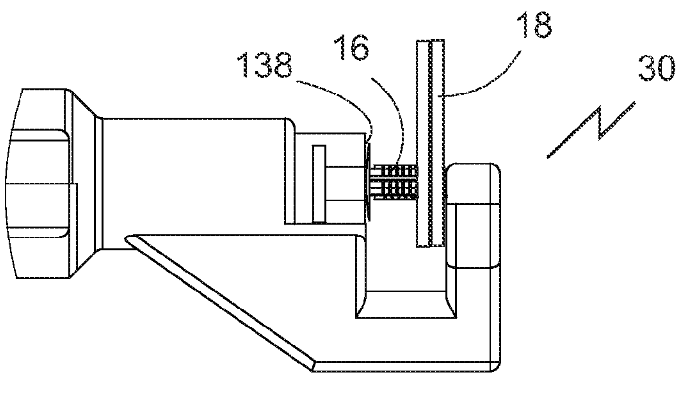

Referring to FIGS. 10A-E, applicator tool 30 may further comprise a retainer 130 for at least partially restricting axial release of the fastener 16 from the fastener mount 34. FIGS. 10A-B illustrate how retainer 130, which may be for example a combination of a fastener backing slot 132 and axial passage 134, accomplishes this function. The retainer 130 may be shaped to contact in use a front surface 135 of a backing 137 of the fastener 16. The retainer 130 may be shaped to at least partially surround a backing of the fastener 16, the retainer 130 defining axial passage 134 for a tip 136 of the fastener 16 to extend beyond the retainer 130 for at least partial application through the cooperating surfaces (not shown). The front surface 135 and tip 136 of an exemplary fastener 16 are illustrated in FIGS. 9A-B. FIGS. 12C and 14 illustrate that the retainer 130 may be formed within the fastener mount 34 as shown and may further define a lateral passage 136 for insertion and removal of the fastener 16 from the fastener mount 34. FIGS. 10E and 14 illustrate also that the fastener mount 34 may comprise an outer axial mount surface 138 for driving in use a partially applied and unretained fastener 16 (FIG. 10E) through the cooperating surfaces 18. Axial and lateral directional language is understood to refer to directions relative to fastener drive axis 108 (FIG. 13).

Figure 19:
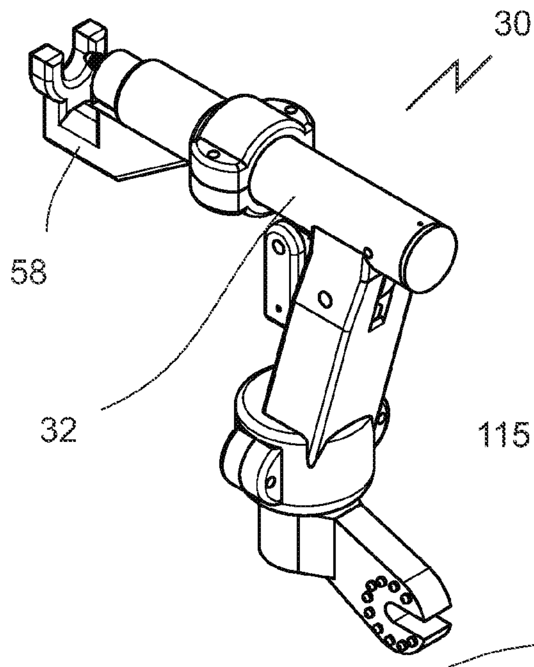
FIGS. 19 and 20 are rear perspective and exploded views of a further embodiment of an applicator tool.
Figure 20:
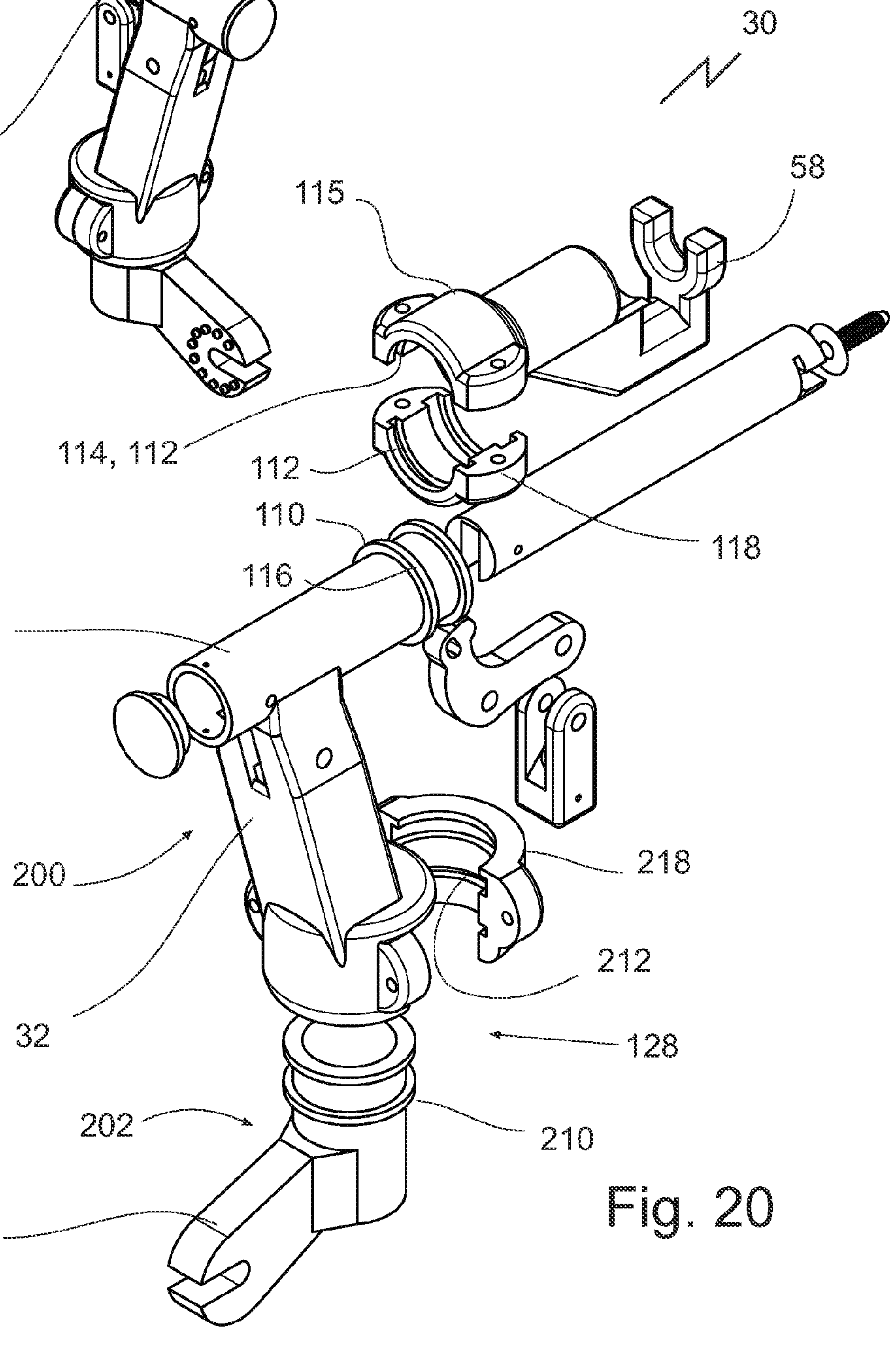
Figure 21:
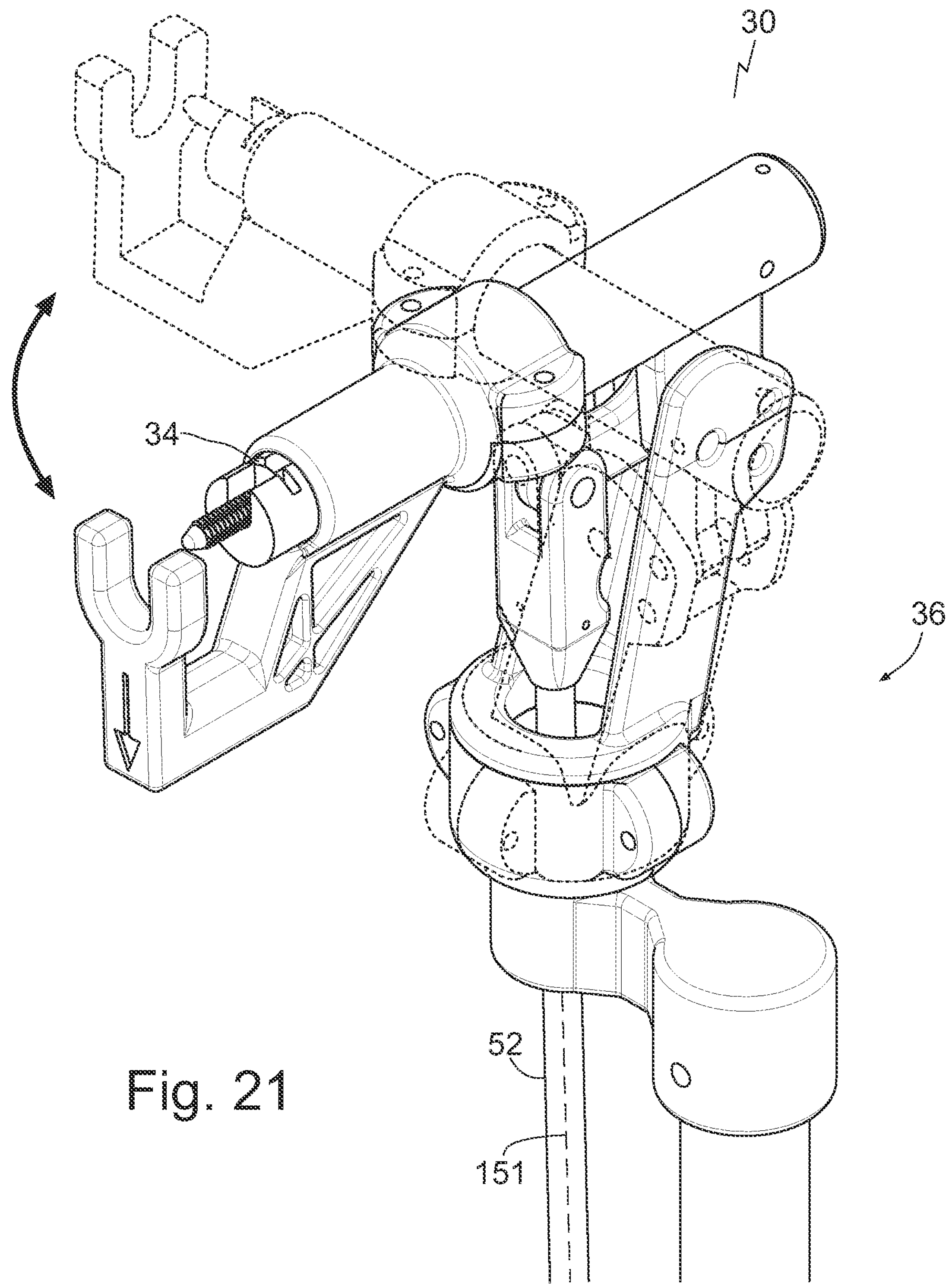
FIG. 21 is a perspective view of another embodiment of an applicator tool, illustrating in dashed lines an example of how the applicator may be repositioned about the handle axis.

Referring to FIGS. 19 and 20, a further embodiment of an applicator tool 30 is illustrated. Like the embodiment illustrated in FIG. 14, backing arm 58 is pivotally connected to structural frame element 32, for example through a tongue 110 and groove 112 connection. However, in the embodiment of FIG. 20, cylinder 66 is pivotally connected to universal spline attachment 42, for example through a tongue 210 and groove 212 connection on handle portion 128. In this case handle portion 128 is effectively split into two portions 200 and 202 that are pivotally connected to one another. Portion 202 is connected to portion 200 using a bracket 218 in a fashion similar to the attachment of backing arm 58 to structural frame element 32 by bracket 118.

FIGS. 10A-E illustrate the stages in an embodiment of the methods disclosed herein. For example, in FIGS. 10A-B, stage 100 is carried out by loading the fastener 16 into the fastener mount 34 by inserting the fastener 16 into the lateral passage 136. Various methods of holding the fastener 16 in place during positioning may be used. For example, one or more dimensions of the fastener backing 137 may be slightly larger than one or more corresponding dimensions of the retainer 130. For further example, the diameter of the fastener backing 137 may be slightly larger than the corresponding diameter of the backing slot 132, such that the fastener backing 137 has to flex to enter the slot 132 and is held in place by friction. In another example the plunger rod 64 may be retractable a sufficient distance as shown in FIG. 10C to at least partially block the backing slot 132 such that the fastener 16 cannot be removed. Such retraction may also be advantageous to effectively increase the width of the gap 60 that the cooperating surfaces 18 fit into. Plunger rod 64 may be retracted by a force supplied by one or more of a biasing device (not shown) or operation of the actuator 50 (FIG. 3A) by the user. A stop (not shown) may be provided to prevent over retraction of plunger rod 64. FIG. 10D illustrates stage 102 and part of stage 104 being carried out. First, tool 30 is positioned such that cooperating surfaces 18 are adjacent as shown. Next, the fastener mount 34 is driven to partially apply the fastener 16 through surfaces 18 while retainer 130 at least partially restricts axial release of the fastener 16. The presence of retainer 130 prevents full application at this point, so the fastener 16 is thus released from the retainer 130. For example, tool 30 may be given a lateral tug to remove the partially applied fastener 16 from the lateral passage 136. FIG. 15 illustrates a range of driving motion of fastener mount 34. Referring to FIG. 10E, the partially applied and unretained fastener 16 is then further applied through cooperating surfaces 18, for example by positioning tool 30 such that fastener 16 is loaded on outer axial mount surface 138 and using actuator 50 to drive the fastener 16 the rest of the way through surfaces 18 to complete application.

Figure 16A:
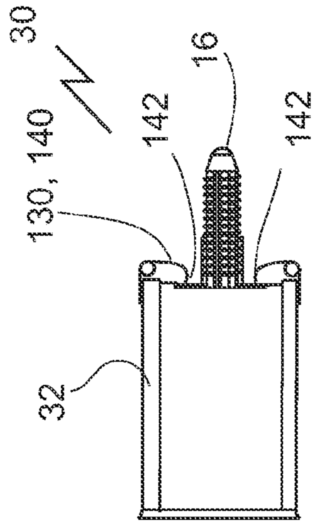
FIGS. 16A-C illustrate a method of operation of an applicator tool with a spring retainer.
Figure 16B:
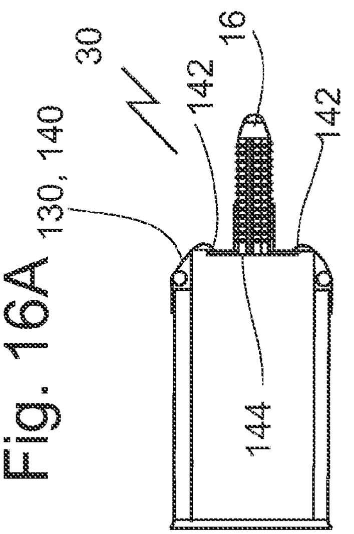
Figure 16C:
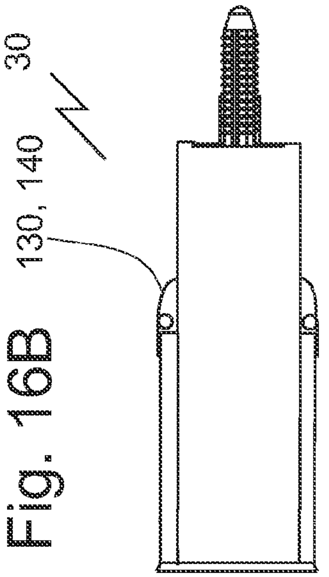
Figure 17A:
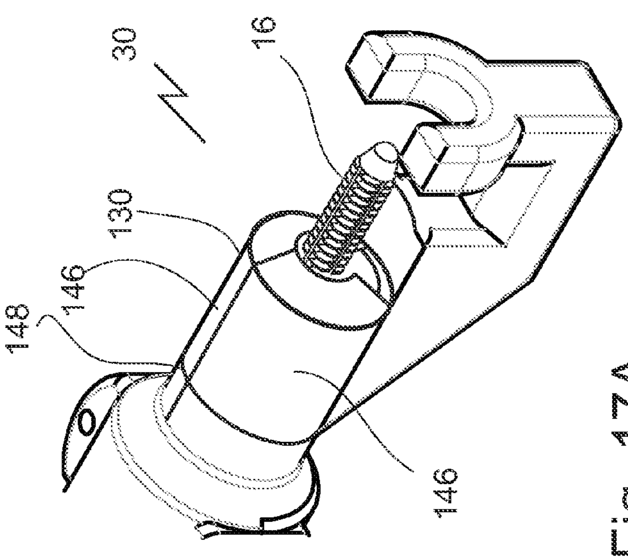
FIGS. 17A and 17 B are perspective views that illustrate a method of operation of an applicator tool with a further retainer.
Figure 17B:
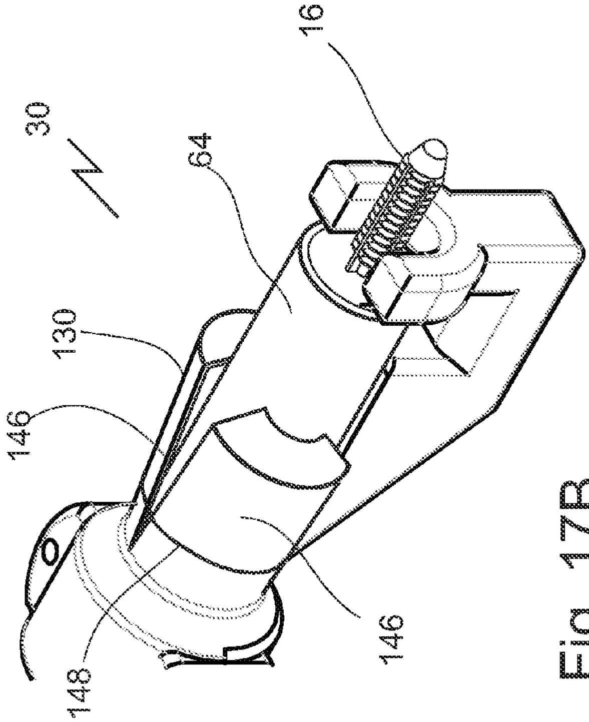
Figure 18A:
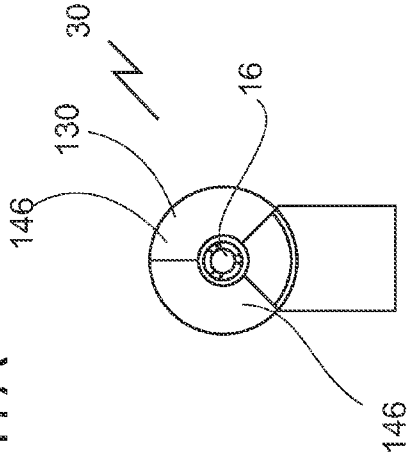
FIGS. 18A-B are front elevation views of the applicator tool of FIGS. 18A and B, respectively.
Figure 18B:
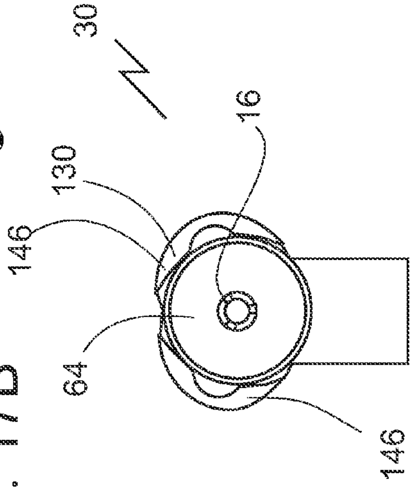

Referring to FIGS. 16A-C, the retainer 130 may be adapted to release the fastener 16 after an initial drive phase (shown in the sequence from FIGS. 16A-B) from the first position (shown in FIG. 16A). In the example shown, retainer 130 is a pair of spring-biased rods 140 that are attached to structural frame element 32. Rods 140 may have ends 142 hooked towards the fastener mount 34 in order to maximize the drive travel from the first position during which fastener 16 is retained. Once fastener mount 34 has travelled a sufficient distance along the fastener drive path, retainer 130 releases fastener 16 (FIG. 16C). Upon release by retainer 130, fastener 16 may still be partially retained for example frictionally retained by a backing slot 144 formed in fastener mount 34. Partial retainment in this manner allows fastener 16 to be removed from mount 34 in an axial direction, whilst preventing fastener 16 from inadvertently falling off of mount 34. The embodiment of FIGS. 16A-C allows application of fastener 16 to be accomplished in a single movement of actuator 50, which is contrasted with the multi-stage procedure used in the embodiment of FIGS. 10A-E. However, the embodiment of FIGS. 10A-E provides the advantage of improving the chance of axial retainment of fastener 16 within the fastener mount 34 in the event of a misfire. FIGS. 17A-B and 18A-B provide another example of a retainer 130 that operates under similar principles as the retainer 130 in FIGS. 16A-C. In this embodiment, retainer 130 comprises one or more flaps 146 that hook over and axially retain fastener 16 against fastener mount 34 when in the first position (FIGS. 17A and 18A), but that also flex outwards upon actuation to release the fastener 16 (FIGS. 17B and 18B). Flaps 146 may be bevelled or cammed (not shown) on an inner surface to ensure outward movement upon axial movement of plunger rod 64. A biasing mechanism, such as a resilient o-ring 148 may encircle flaps 146 to ensure that flaps 146 close upon passage of plunger rod 64 back into the first position.

Referring to FIGS. 5A and 8, in one embodiment the fastener 16 is a Christmas tree fastener that is at least partially applied through one of the cooperating surfaces 18 before being loaded on the fastener mount 34. At least partially applied is understood to mean that the fastener has been inserted a sufficient distance into the surface 18 to catch and prevent removal of the fastener from the surface 18. The method may include the stage of pre-applying the fastener 70 in one of the cooperating surfaces 18. Thus, as shown in FIG. 5A, the stages of loading and positioning may be achieved simultaneously by positioning the applicator 30 such that fastener mount 34 is adjacent fastener 16 and both cooperating surfaces 18 are adjacent the fastener 16. As can be seen in the transition from FIG. 8 to FIG. 5A, backing arms 58 may aid in holding the cooperating surfaces 18 in alignment and as close together as possible before fastener application. Such a method is advantageous in cases where applicator tool 30 only holds one fastener 16 at a time and more than one fastener 16 needs to be applied to secure a protector in place, because all fasteners 16 can be installed sequentially upon positioning the dielectric cover in place without having to reload the tool 30 by hand. In some cases, all but one of the required fasteners 16 are partially applied before placement of the cover, in order to leave at least one set of aligned holes for use with positioning tools for properly positioning the cover about the component to be protected prior to completing fastener application.

As discussed above, the electrical power transmission system 14 may be energized and the applicator tool 30 made at least partially of dielectric material. In such embodiments, positioning may further comprise positioning the applicator tool 30 at least partially within a safe Limit of Approach 22C. Standard limits of approach 22 are generally set by the IEEE for live electrical systems. It should be understood that the limits of approach may vary according to region. The limits of approach 22 around energized equipment generally widens as the voltage increases. In FIG. 3A, the limits of approach 22 correspond to increasing voltages, and thus increasing radii, from limits of approach 22A-C. For this purpose, hotstick 20 may be provided in a length that is suitable for the various limits of approach standards in all jurisdictions. Positioning in stage 102 and driving in stage 104 may be done by a user 24 who is in a position outside the safe Limit of Approach 22C. Thus, fasteners 16 may be remotely installed. In some embodiments the fastener mount 34 is located at a fastener end 46 of the applicator tool 30, and positioning comprises positioning the hot stick stock 44 such that the cooperating surfaces 18 are adjacent the fastener 16. In such embodiments, driving may also comprise operating the actuator 50 from an operation end 56 of the hot stick stock 44. As shown in FIG. 3A, positioning may further comprise positioning such that the cooperating surfaces 18 are restrained from movement by a backing arm 58.

Figure 22:
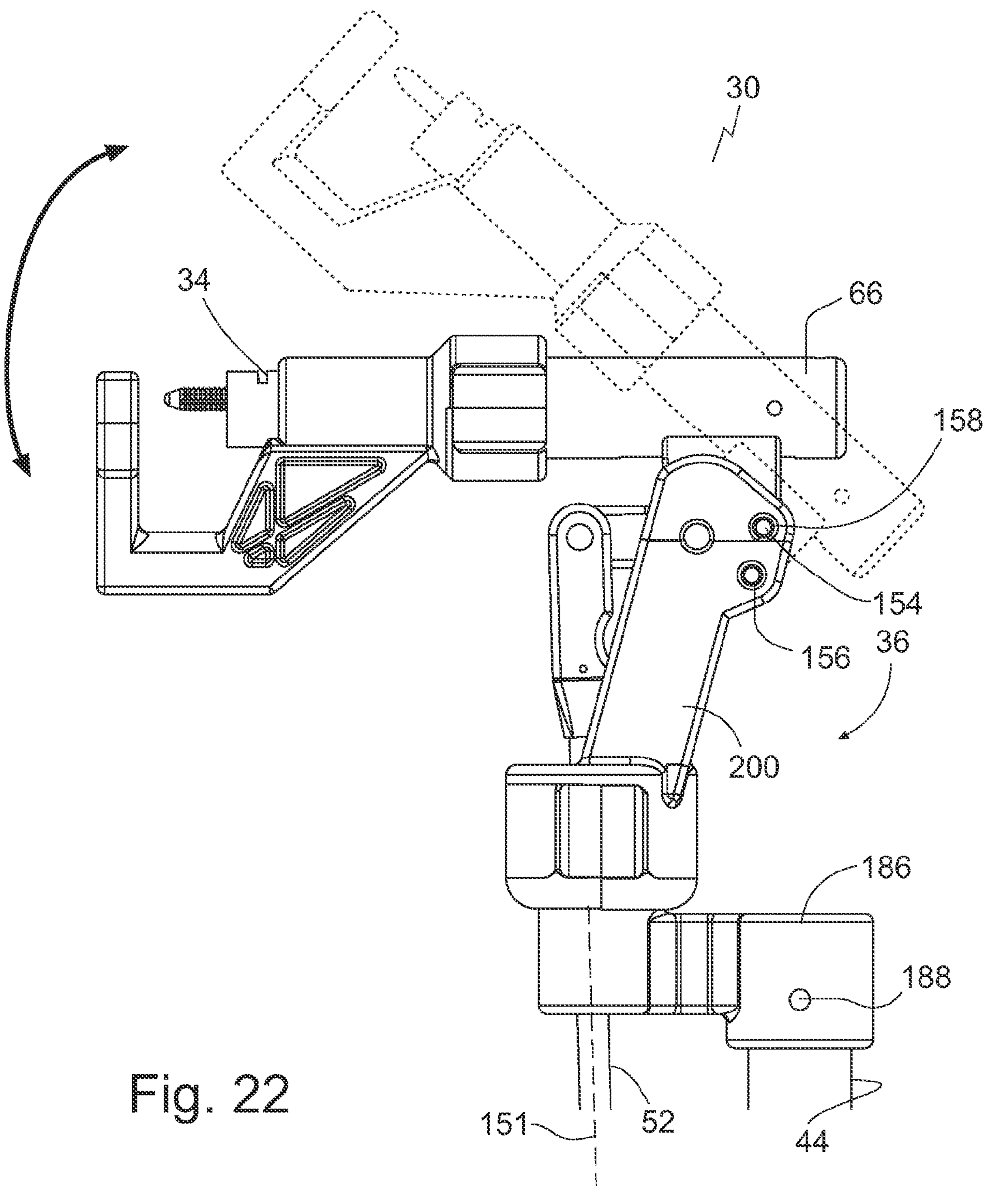
FIG. 22 is a side elevation view of the applicator tool of FIG. 21, illustrating in dashed lines an example of how the applicator may be repositioned at different angles relative to the handle axis.

Referring to FIGS. 21-24, as described above the fastener mount 34 may be pivotally connected, directly or indirectly as shown, to the handle 36. For example, the fastener mount 34 may be one or both of connected to pivot relative to a handle axis, such as axis 151 of a drive rod 52 (FIG. 21) in a fashion similar to that shown in FIG. 20, or connected to pivot at different angles relative to the handle axis (FIG. 22). The range of pivotal motion may be up to 360 degrees or more, defining a finite or infinite number of positions in between. In one embodiment the fastener mount 34 is connected to pivot between ninety and one hundred thirty five degrees relative to the handle 36 (FIG. 22). As described above for the backing arm 58, a mechanism such as a lock pin 154 (FIG. 22) passed through aligned one or more lock holes 152 in the cylinder 66, and either one or more lock holes 156 or one or more lock holes 158 (FIGS. 22, 23, 24) in the handle portion 200 may be used to temporarily lock and unlock the fastener mount 34 radially in place in different positions (FIG. 22).

Figure 23:
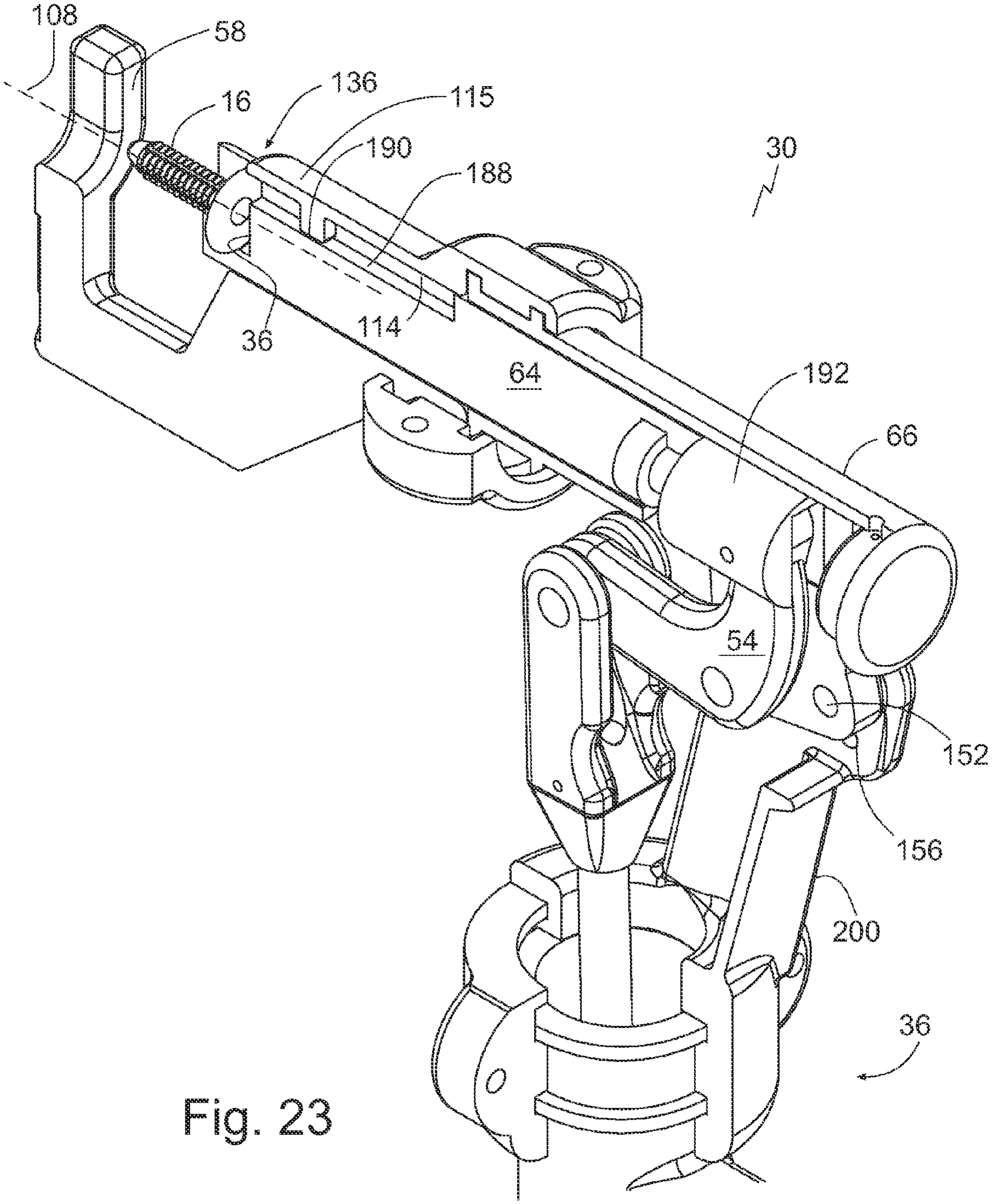
FIG. 23 is a cut away perspective view of the applicator tool of FIG. 21.
Figure 24:
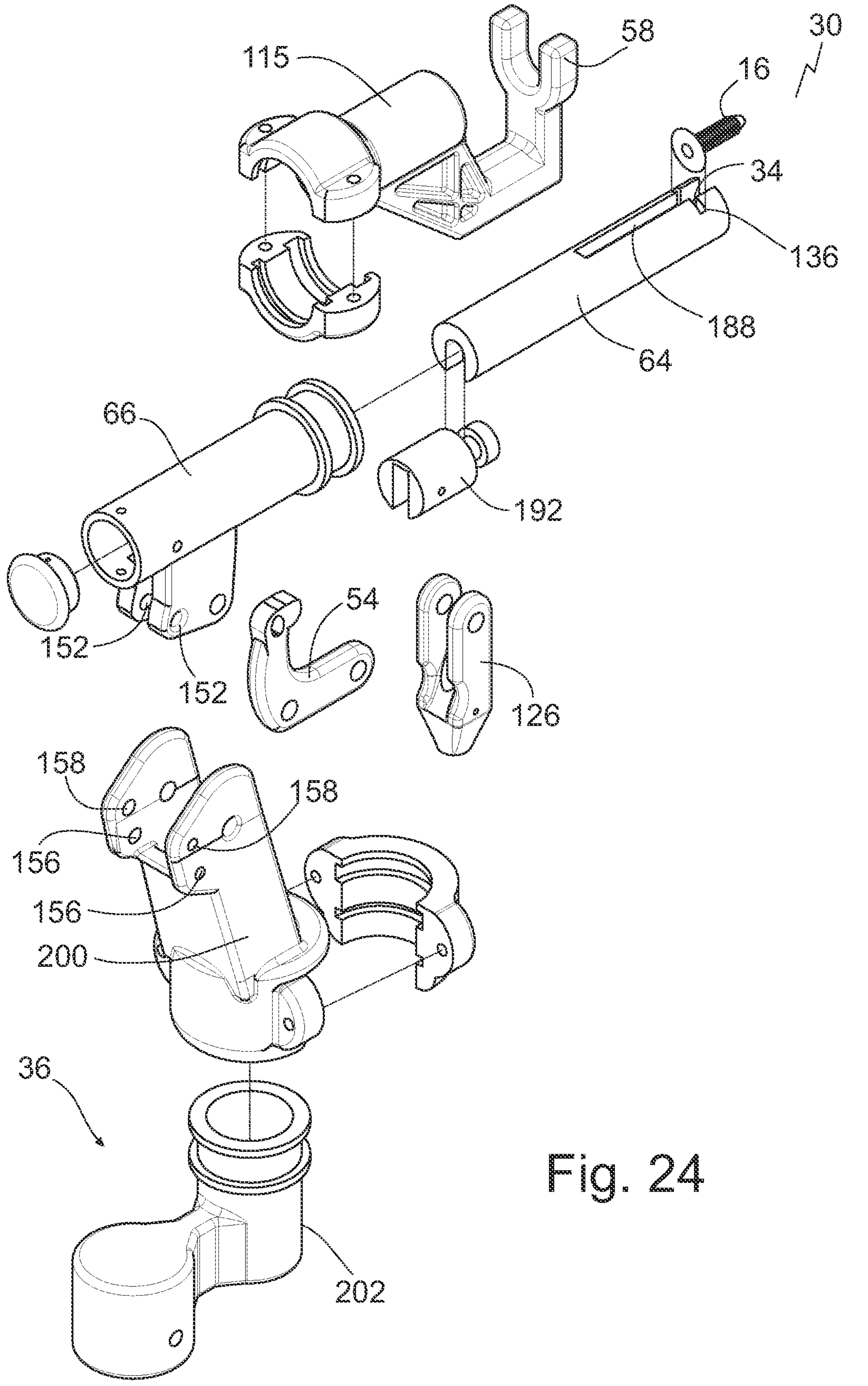
FIG. 24 is an exploded perspective view of the applicator tool of FIG. 21.

Referring to FIGS. 23 and 24, the fastener mount 34 may be connected for radial movement with the backing arm 58 about the fastener drive axis 108. For example, a keyway 188 may be defined in plunger rod 64 for a key 190 defined in inner surface 114 of body portion 115 of backing arm 58, in order to radially connect plunger rod 64 and backing arm 58. Thus, lateral passage 136 for removal/insertion of fastener 16 may be maintained out of alignment with backing arm 58 to prevent backing arm 58 from inadvertently blocking lateral passage 136 on repositioning backing arm 58. To allow plunger rod 64 to be able to rotate with backing arm 58, plunger rod 64 may be connected for radial rotation to an articulating piston 192, which itself connects to lever arm 54.

Figure 25:
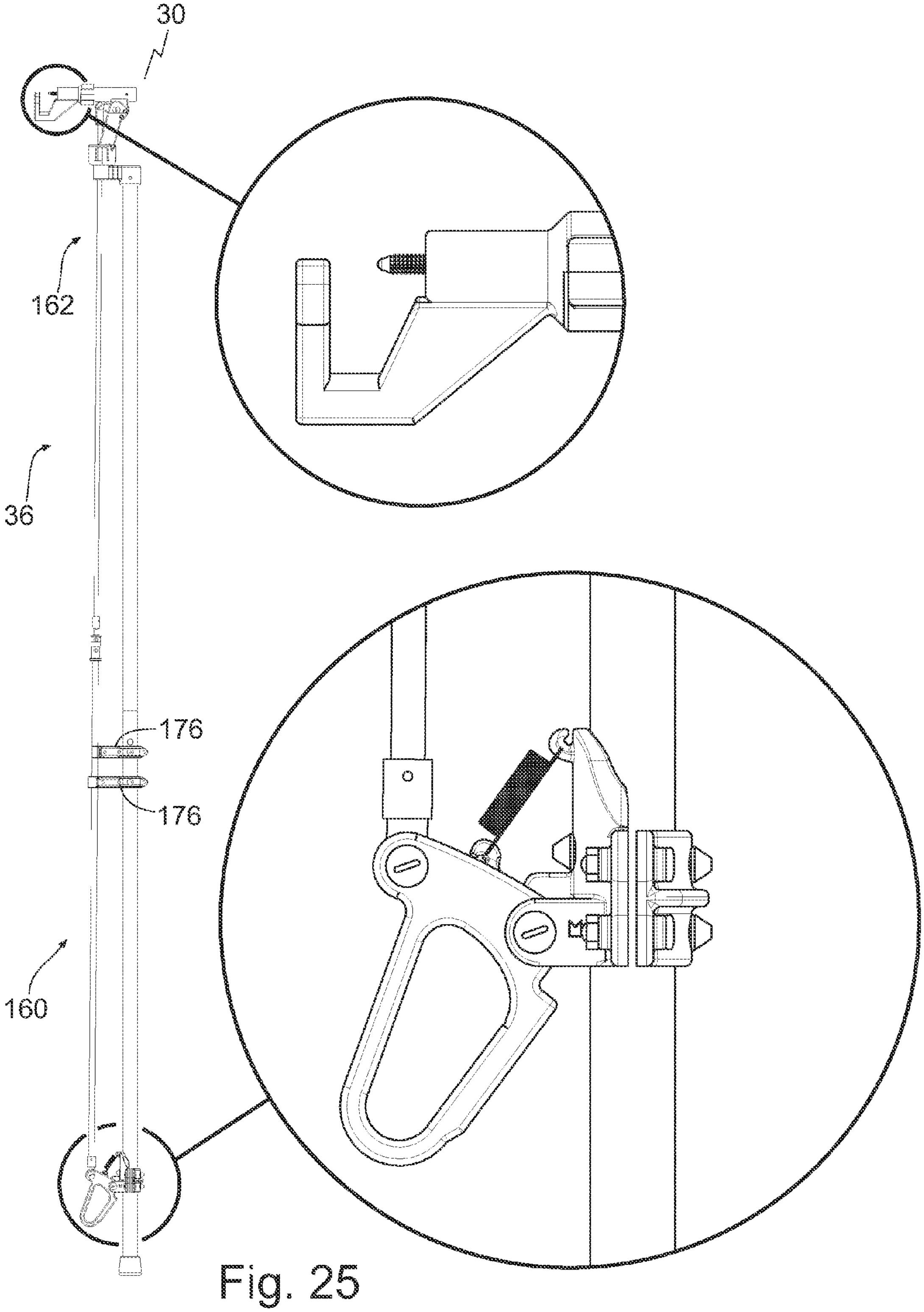
FIGS. 25 and 26 are side elevation views of the applicator tool of FIG. 21 in the open and closed position, respectively, and connected to a hot stick stock.
Figure 26:
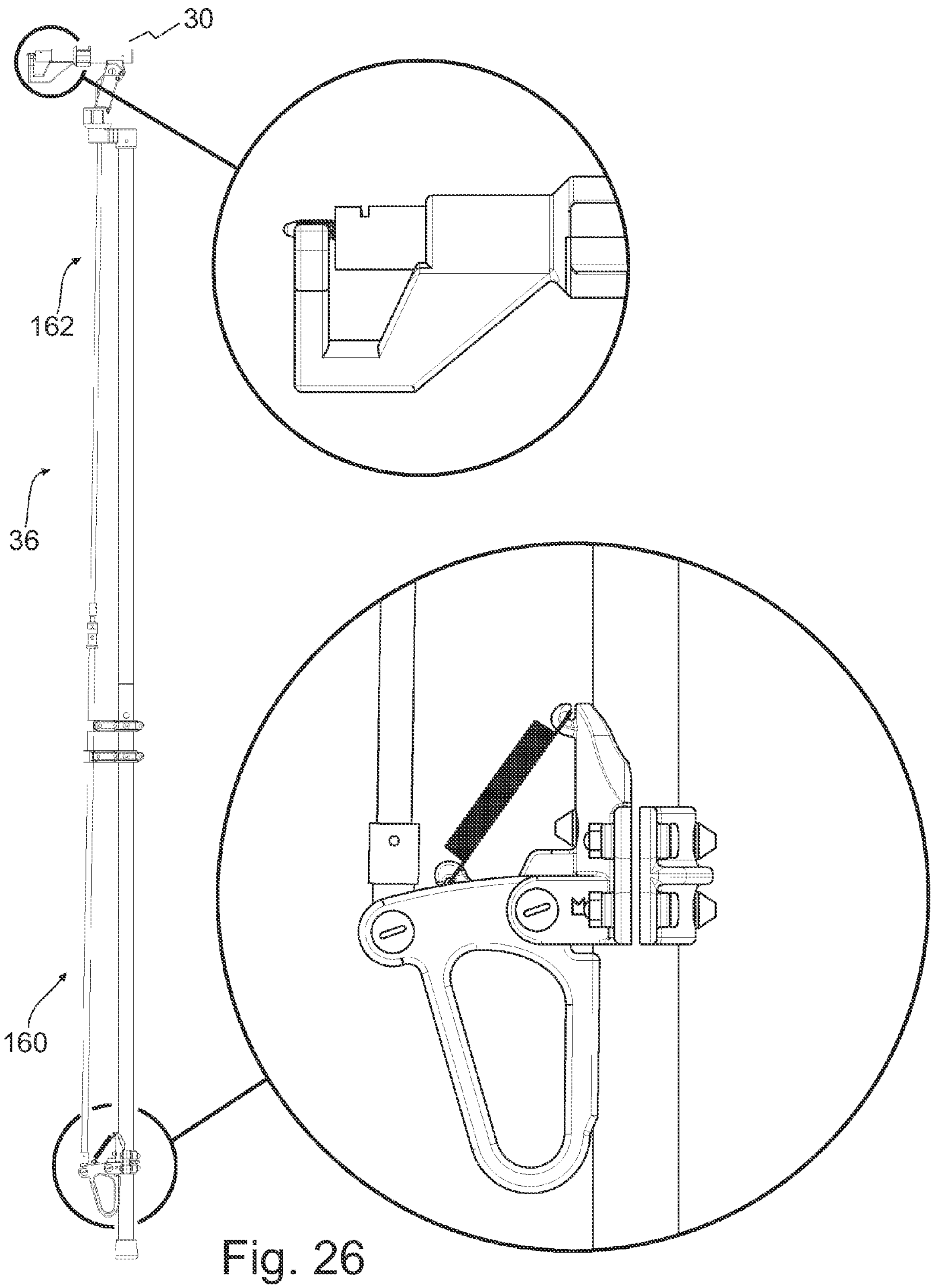
Figure 28:
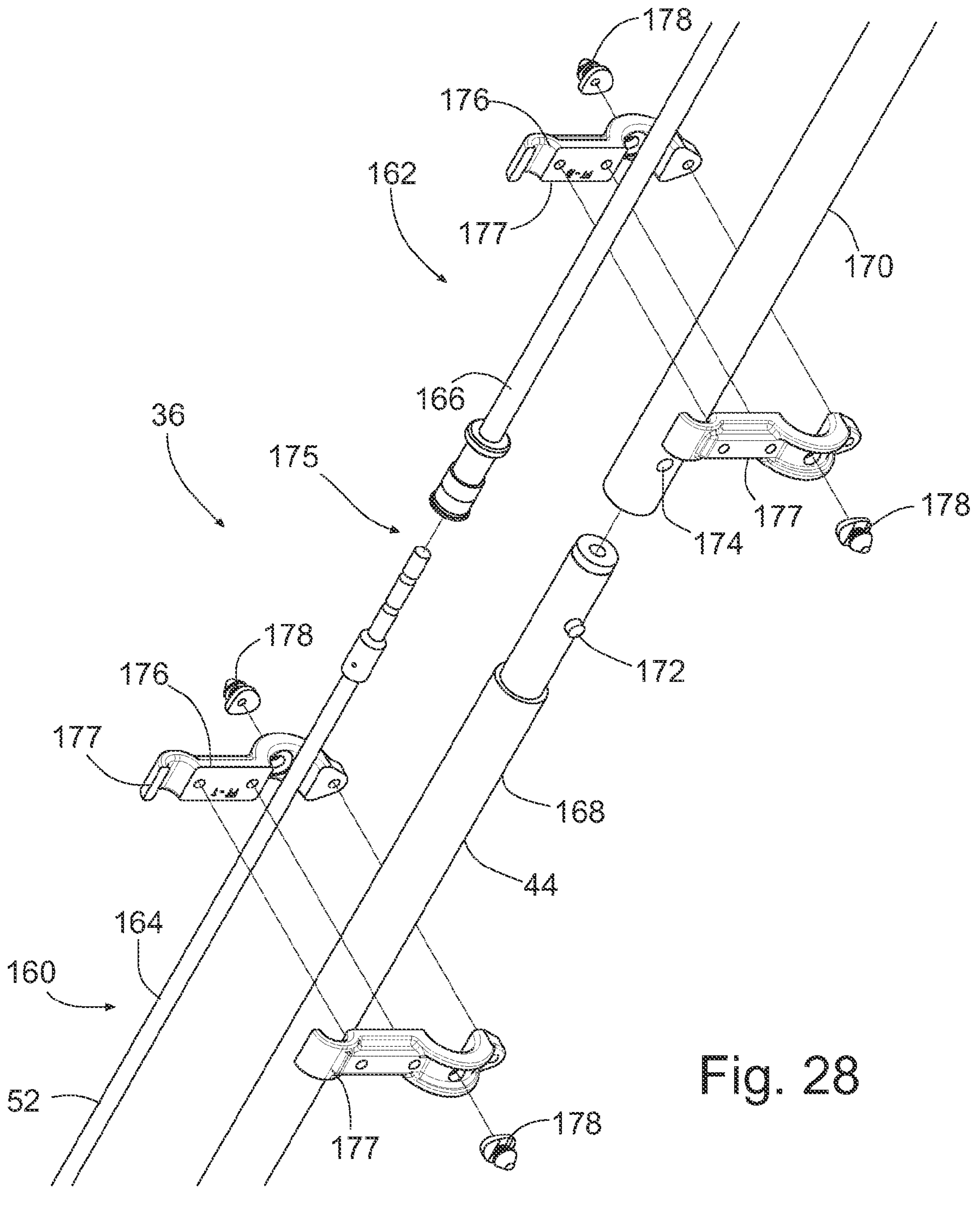
FIG. 28 is an exploded perspective intermediate view of the hot stick stock of FIGS. 25 and 26.

Referring to FIGS. 25-26 and 28, the handle 36 may be extendable, for example if provided in two or more portions 160 and 162 as shown. Portions 160 and 162 may each comprise respective actuator portions 164 and 166, and respective hot stick stock portions 168 and 170 (FIG. 28) connected by suitable connection mechanisms such as a lateral spring biased locking pin 172 and hole 174 connection, or a spring loaded coupler 175 with locking cam. The embodiment of FIG. 28 also allows the applicator tool 30 to be separated into two or more parts for transport or storage. Other extension/retraction mechanisms are possible, for example a telescopic mechanism (not shown).

Referring to FIGS. 25 and 28, applicator tool 30 may comprise one or more spacer brackets 176 between the actuator 50 and the hot stick stock 44. Each bracket 176 may be have two or more portions 177 (FIG. 28). Brackets 176 may connect rigidly to stock 44, for example using resilient plugs 178 (FIG. 28) while loosely connecting to actuator 50 to allow relative sliding motion. In another embodiment, brackets 176 may rigidly connect to actuator 50 and loosely connect to stock 44 (not shown). Brackets 176 may laterally space stock 44 and actuator 50 as shown, or may align actuator 50 within or concentrically around stock 44 (not shown).

Figure 27:
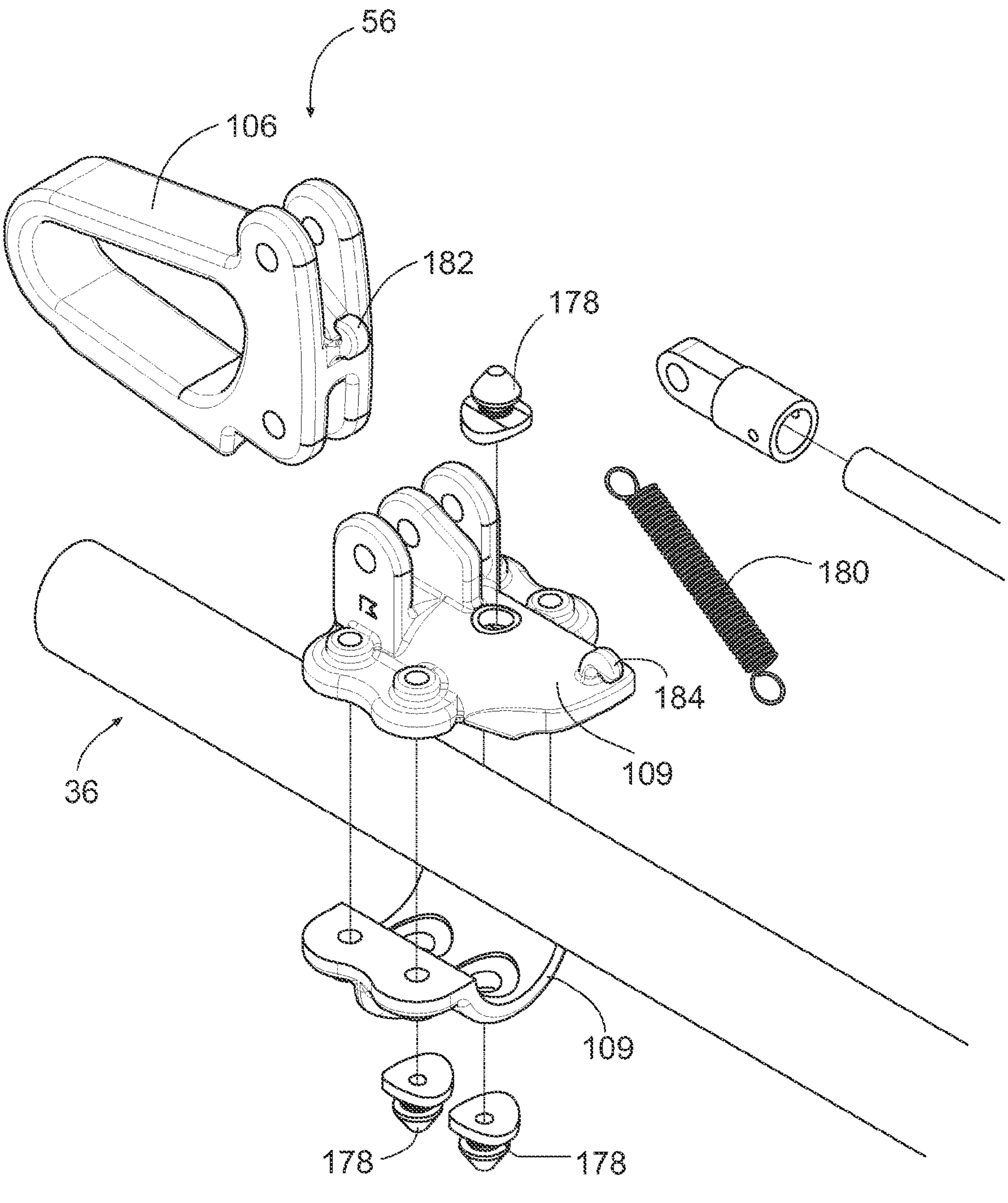
FIG. 27 is an exploded perspective view of the operation end of the hot stick stock of FIGS. 25 and 26.

Referring to FIG. 27, a biasing mechanism such as a spring 180 may be used to retract trigger lever 106. Spring 180 may connect between hooks 182 and 184 on lever 106 and bracket 109, respectively.

Embodiments of the applicator tools 30 and methods disclosed may have various benefits. For example, tool 30 may require only low-pressure installation as opposed to the high pressure installation required for many nail guns and riveters. It should be understood however that embodiments of applicator tool 30 disclosed herein contemplate the use of non-human power sources, for example from an electric drill or a pressure source. Energized application is also a benefit to the electrical industry as discussed above. Tool 30 may make the fastener installation process easier and protect line workers by removing the temptation to remove gloves and work bare-handed. In addition, tool 30 may have broad application to a variety of industries.

Although the applicator tools 30 disclosed herein are described with reference to application of fasteners to dielectric covers on electrical system components, it should be understood that applicator tool 30 may form a low-pressure applicator for use in installing fasteners 16 in other applications outside of the electrical power transmission system field. For example, the applicator tool 30 may be used to secure cooperating sheets of metal together.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of applying a fastener through cooperating surfaces of a dielectric protector placed at least partially over a component of an electrical power transmission system, in which the electrical power transmission system is energized, the method comprising:

loading the fastener on a fastener mount of an applicator tool, the applicator tool being made at least partially of dielectric material;

positioning the applicator tool, at least partially within a safe Limit of Approach defined by a conductor carrying a voltage of 2400 volts or higher, such that the cooperating surfaces are adjacent the fastener; and driving the fastener mount, by operation of an actuator relative to at least a portion of the applicator tool to apply the fastener through the cooperating surfaces of material;

in which positioning and driving are done by a user who is in a position outside the safe Limit of Approach.

2. The method of claim 1 in which the fastener mount is located at a fastener end of the applicator tool, the applicator tool comprises a hot stick stock, and positioning comprises positioning the hot stick stock such that the cooperating surfaces are adjacent the fastener, and driving comprises operating the actuator from an operation end of the hot stick stock opposed to the fastener end.

3. The method of claim 1 in which the fastener is driven through aligned holes within the cooperating surfaces.

4. The method of claim 3 further comprising forming one or more of the aligned holes with one or both of the fastener or the applicator tool.

5. The method of claim 1 in which the fastener is a Christmas tree fastener that is at least partially applied through one of the cooperating surfaces before being loaded on the fastener mount.

6. The method of claim 1 in which driving further comprises:

partially applying the fastener through the cooperating surfaces while at least partially restricting axial release of the fastener from the fastener mount with a retainer;

releasing the fastener from the retainer; and further applying the fastener through the cooperating surfaces.

7. The method of claim 1 in which the applicator tool is made of dielectric material.

8. The method of claim 1 in which the applicator tool comprises a backing arm spaced from the fastener mount to define a gap, and in which positioning further comprises positioning the applicator tool such that the cooperating surfaces are within the gap.

9. The method of claim 1 in which driving is done using drive force supplied by a user.

10. The method of claim 9 in which driving is done by inputting the drive force into a trigger, which is connected by mechanical linkage to transfer the drive force through the actuator and to the fastener mount.

11. The method of claim 10 in which the actuator comprises one or more lever arms connected to the fastener mount.

12. The method of claim 1 in which driving comprises driving the fastener mount along a linear drive path.

13. The method of claim 12 in further comprising, after driving the fastener mount, retracting the fastener mount along the linear drive path.

* * * * *